US012610174B2

(12) United States Patent
Lin

(10) Patent No.: US 12,610,174 B2
(45) Date of Patent: Apr. 21, 2026

(54) HEADPHONE

(71) Applicant: CHENG UEI PRECISION INDUSTRY CO., LTD., New Taipei (TW)

(72) Inventor: Chin-Chung Lin, New Taipei (TW)

(73) Assignee: CHENG UEI PRECISION INDUSTRY CO., LTD., New Taipei City (TW)

(*) Notice: Subject to any disclaimer, the term of this patent is extended or adjusted under 35 U.S.C. 154(b) by 173 days.

(21) Appl. No.: 18/731,077

(22) Filed: May 31, 2024

(65) Prior Publication Data

US 2025/0126397 A1 Apr. 17, 2025

(30) Foreign Application Priority Data

Oct. 12, 2023 (CN) ......................... 202322732246.5

(51) Int. Cl.
*H04R 1/10* (2026.01)
*H04R 1/02* (2006.01)

(52) U.S. Cl.
CPC ........... *H04R 1/1058* (2013.01); *H04R 1/028* (2013.01); *H04R 1/1008* (2013.01); *H04R 1/1041* (2013.01); *H04R 2201/029* (2013.01)

(58) Field of Classification Search
CPC .... H04R 1/1058; H04R 1/028; H04R 1/1008; H04R 1/1041; H04R 2201/029; H04R 5/0335; H04R 1/1033; H04R 1/02; H04R 1/10; H04R 1/1075; H04R 1/1091; H04R 2205/022
USPC ............ 381/309, 370, 371, 384, 74, 72, 376
See application file for complete search history.

(56) References Cited

U.S. PATENT DOCUMENTS

| | | | | |
|---|---|---|---|---|
| 9,467,767 | B2 * | 10/2016 | Chen | H04R 5/033 |
| 9,803,852 | B1 * | 10/2017 | Clacken | H04R 1/1058 |
| 11,747,011 | B2 * | 9/2023 | Tseng | H04R 1/1058 362/86 |
| 12,035,097 | B2 * | 7/2024 | Kulavik | H04R 1/1041 |
| 12,096,172 | B2 * | 9/2024 | Tseng | G02B 6/0088 |
| 2003/0012003 | A1 * | 1/2003 | Bischof | H04M 1/23 361/752 |
| 2014/0014481 | A1 * | 1/2014 | Dai | H01H 13/52 200/247 |

* cited by examiner

*Primary Examiner* — Xu Mei
(74) *Attorney, Agent, or Firm* — Cheng-Ju Chiang

(57) ABSTRACT

A headphones comprising: a shell having a sidewall, an inner sidewall surface and an open hole, an outer wall connected to the sidewall and having an inner wall surface, two first retaining walls arranged on the inner wall surface to align with the open hole; a light guiding unit arranged in the open hole and comprising: a guiding unit body passing through the open hole, a guide tab extended from the guiding unit body, a guiding unit base extended from the guide tab and placed between the two first retaining walls; and a circuit board arranged in the shell and provided with an open slot, wherein the opening of the open slot is extended inwardly from the circuit board; the guide tab is inserted into the open slot and the light guiding unit is positioned between the circuit board and the inner sidewall surface. Thus, headphones can be stably assembled.

20 Claims, 20 Drawing Sheets

HEADPHONE

CROSS REFERENCE TO RELATED APPLICATIONS

The present application is based on, and claims priority from, China Patent Application No. 202322732246.5, filed Oct. 12, 2023, the disclosure of which is hereby incorporated by reference herein in its entirety.

BACKGROUND OF THE INVENTION

Field of the Invention

The present invention generally relates to a headphone, and more particularly to a headphone including a light guiding unit that is able to be stably assembled.

Description of Related Art

A conventional headphone includes two earphone units, and a headband connected between the two earphone units. Each earphone unit is equipped with a circuit board. A surface of each earphone unit is equipped with a light guiding unit. The light guiding unit is arranged to guide light rays emitted by a light emitter of the circuit board to the surface of the earphone unit for indicating corresponding functions and states of the headphone, so a user easily distinguishes the corresponding functions and states of the headphone. The light guiding unit has a locking clasp. The locking clasp hooks the earphone unit, so that the light guiding unit is fastened to the earphone unit.

However, the light guiding unit is only able to be fastened in an extension direction of the locking clasp, and the light guiding unit is without a positioning and fastening capability in a direction which is different from the extension direction of the locking clasp. Therefore, the light guiding unit of the conventional headphone is unable to be stably assembled to the earphone unit.

Therefore, it is necessary to provide a headphone including a light guiding unit that is able to be stably assembled.

BRIEF SUMMARY OF THE INVENTION

An object of the present invention is to provide a headphone including a light guiding unit that is able to be stably assembled. The headphone includes an outer housing, a light guiding unit, two push buttons and a circuit board. The outer housing has a peripheral wall, a button hole, an outer wall and two first retaining walls. An inner surface of the peripheral wall is defined as an inner periphery surface. An outer surface of the peripheral wall is defined as an outer periphery surface. The button hole penetrates through the inner periphery surface and the outer periphery surface. The outer wall is connected with an outer periphery of the peripheral wall. An inner surface of the outer wall is defined as an interior surface. The inner periphery surface is connected with a periphery of the interior surface. The two first retaining walls are extended from the interior surface. The two first retaining walls are corresponding to the button hole. The light guiding unit is mounted in the outer housing, and the light guiding unit partially penetrates through the button hole. The light guiding unit has a guiding body partially passing through a middle of the button hole, a guiding board and a supporting base. An outer portion of the guiding body protrudes towards the interior surface to form the guiding board. An inner end of the guiding board is positioned between the two first retaining walls. An inner surface of the guiding board protrudes inward to form a propping portion. An inner surface of the propping portion protrudes inward, and then extends upward and downward to form the supporting base. The guiding board is connected with a middle of the supporting base by the propping portion. The supporting base is clamped by the two first retaining walls. An upper portion of the supporting base and a lower portion of the supporting base are bent outward to form two fixing arms. The two fixing arms abut against two facing surfaces of the two first retaining walls. Two outer ends of the two fixing arms oppositely protrude perpendicular to the two fixing arms to form two hooks. The two hooks hook two outer end surfaces of the two first retaining walls. The two push buttons are mounted in the outer housing. The two push buttons partially pass through the button hole. The light guiding unit is positioned between the two push buttons. The circuit board is mounted in the outer housing. An edge of the circuit board is recessed inward to form an inserting slot. The guiding body is inserted into the inserting slot to locate the light guiding unit between the circuit board and the inner periphery surface of the outer housing. The circuit board abuts against the supporting base to locate the light guiding unit between the circuit board and the interior surface of the outer housing.

Another object of the present invention is to provide a headphone, comprising: an outer housing having a peripheral wall, an inner surface of the peripheral wall being defined as an inner periphery surface, an outer surface of the peripheral wall being defined as an outer periphery surface, a button hole penetrating through the inner periphery surface and the outer periphery surface, an outer wall connected with an outer periphery of the peripheral wall, an inner surface of the outer wall being defined as an interior surface, the inner periphery surface being connected with a periphery of the interior surface, and two first retaining walls extended from the interior surface; a light guiding unit mounted in the outer housing, and the light guiding unit partially penetrating through the button hole, the light guiding unit having a guiding body partially passing through a middle of the button hole, a guiding board, an outer portion of the guiding body protruding towards the interior surface to form the guiding board, a first reinforcing portion, a middle of an inner portion of the guiding body protruding opposite to the guiding board to form the first reinforcing portion, and a supporting base, extending from the guiding board, and then extending upward and downward to form the supporting base, the guiding board being connected with a middle of the supporting base by the propping portion, the supporting base being clamped by the two first retaining walls, an upper portion of the supporting base and a lower portion of the supporting base being bent outward to form two fixing arms, the two fixing arms abutting against two facing surfaces of the two first retaining walls, two outer ends of the two fixing arms oppositely protruding perpendicular to the two fixing arms to form two hooks, the two hooks hooking two outer end surfaces of the two first retaining walls; two push buttons mounted in the outer housing, the two push buttons partially passing through the button hole, the light guiding unit being positioned between the two push buttons; a circuit board mounted in the outer housing, an edge of the circuit board being recessed inward to form an inserting slot, the guiding body being inserted into the inserting slot to locate the light guiding unit between the circuit board and the inner periphery surface of the outer housing, the circuit board abutting against the supporting base to locate the light guiding unit between the circuit board and the interior surface of the outer housing; and an inner housing assembled with the outer housing, a surface of the inner housing which is towards the outer housing protruding towards the outer housing to form a limiting portion, the limiting portion being mounted around the first reinforcing portion to position the light guiding unit between the limiting portion and the inner periphery surface, and the light guiding unit being located between the interior surface of the outer housing and the surface of the inner housing which is towards the outer housing.

Another object of the present invention is to provide a headphone. The headphone includes an outer housing, a light guiding unit, two push buttons and a circuit board. The outer housing has a peripheral wall, a button hole, an outer wall and two first retaining walls. An inner surface of the peripheral wall is defined as an inner periphery surface. An outer surface of the peripheral wall is defined as an outer periphery surface. The button hole penetrates through the inner periphery surface and the outer periphery surface. The outer wall is connected with an outer periphery of the peripheral wall. An inner surface of the outer wall is defined as an interior surface. The inner periphery surface is connected with a periphery of the interior surface. The two first retaining walls are extended from the interior surface. The light guiding unit is mounted in the outer housing, and the light guiding unit partially penetrates through the button hole. The light guiding unit has a guiding body partially passing through a middle of the button hole, a guiding board and a supporting base. An outer end of the guiding body abuts the inner periphery surface. An outer portion of the guiding body protrudes towards the interior surface to form the guiding board. An inner surface of the guiding board protrudes inward to form a propping portion. An outer end of the guiding board abuts the inner periphery surface, and an outer side of the guiding board abuts against the interior surface. An inner surface of the propping portion protrudes inward, and then extends upward and downward to form the supporting base. The supporting base is clamped by the two first retaining walls. An upper portion of the supporting base and a lower portion of the supporting base are bent outward to form two fixing arms. The two fixing arms abut against two facing surfaces of the two first retaining walls. Two outer ends of the two fixing arms oppositely protrude perpendicular to the two fixing arms to form two hooks. The two hooks hook two outer end surfaces of the two first retaining walls. The two push buttons are mounted in the outer housing. The two push buttons partially pass through the button hole. The light guiding unit is positioned between the two push buttons. The circuit board is mounted in the outer housing. An edge of the circuit board is recessed inward to form an inserting slot. The guiding body is inserted into the inserting slot to locate the light guiding unit between the circuit board and the inner periphery surface of the outer housing. The propping portion is positioned between circuit board and the guiding body. The circuit board abuts against the supporting base to locate the light guiding unit between the circuit board and the interior surface of the outer housing.

As described above, the two fixing arms abut against the two facing surfaces of the two first retaining walls for locating the light guiding unit in the outer housing, and the two hooks hook the two outer end surfaces of the two first retaining walls to prevent the light guiding unit breaking away from an assembling direction. Furthermore, the first reinforcing portion is mounted inside the limiting portion to locate the light guiding unit, two second reinforcing portions abut against two facing surfaces of two second retaining walls to fasten the light guiding unit, the first ramp is fastened in the first notch and the first reinforcing portion is restricted into the first notch to locate the light guiding unit to the outer housing, and the second ramp is fastened in the second notch to locate the light guiding unit to the outer housing. In addition, the guiding body of the light guiding unit is inserted into the inserting slot, and the circuit board abuts against the supporting base of the light guiding unit, the two first retaining walls, the two second retaining walls and two retaining portions of the two push buttons to locate the two push buttons with the light guiding unit, and the two push buttons are isolated by the light guiding unit. As a result, the headphone including the light guiding unit that is able to be stably assembled.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
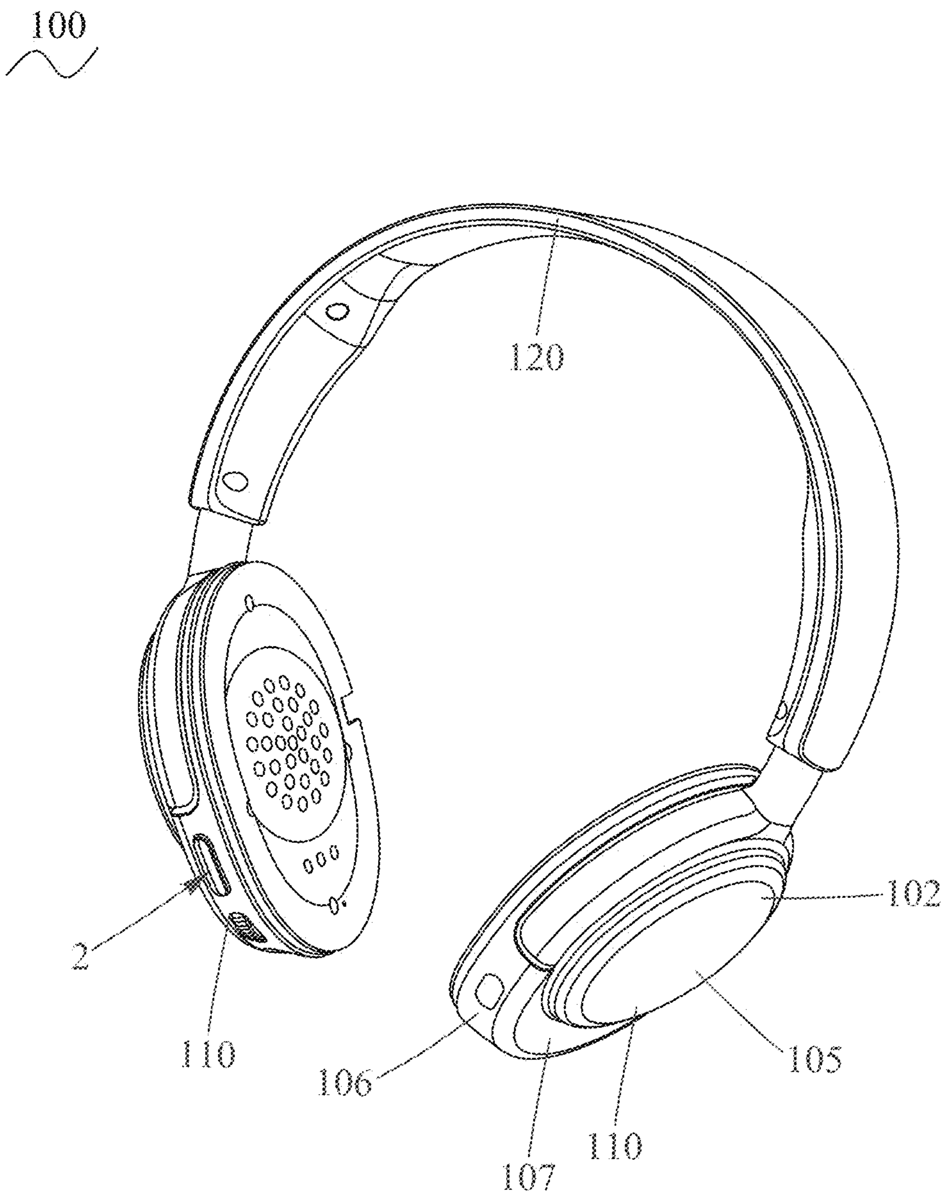
FIG. 1 is a perspective view of a headphone in accordance with the present invention.
Figure 2:
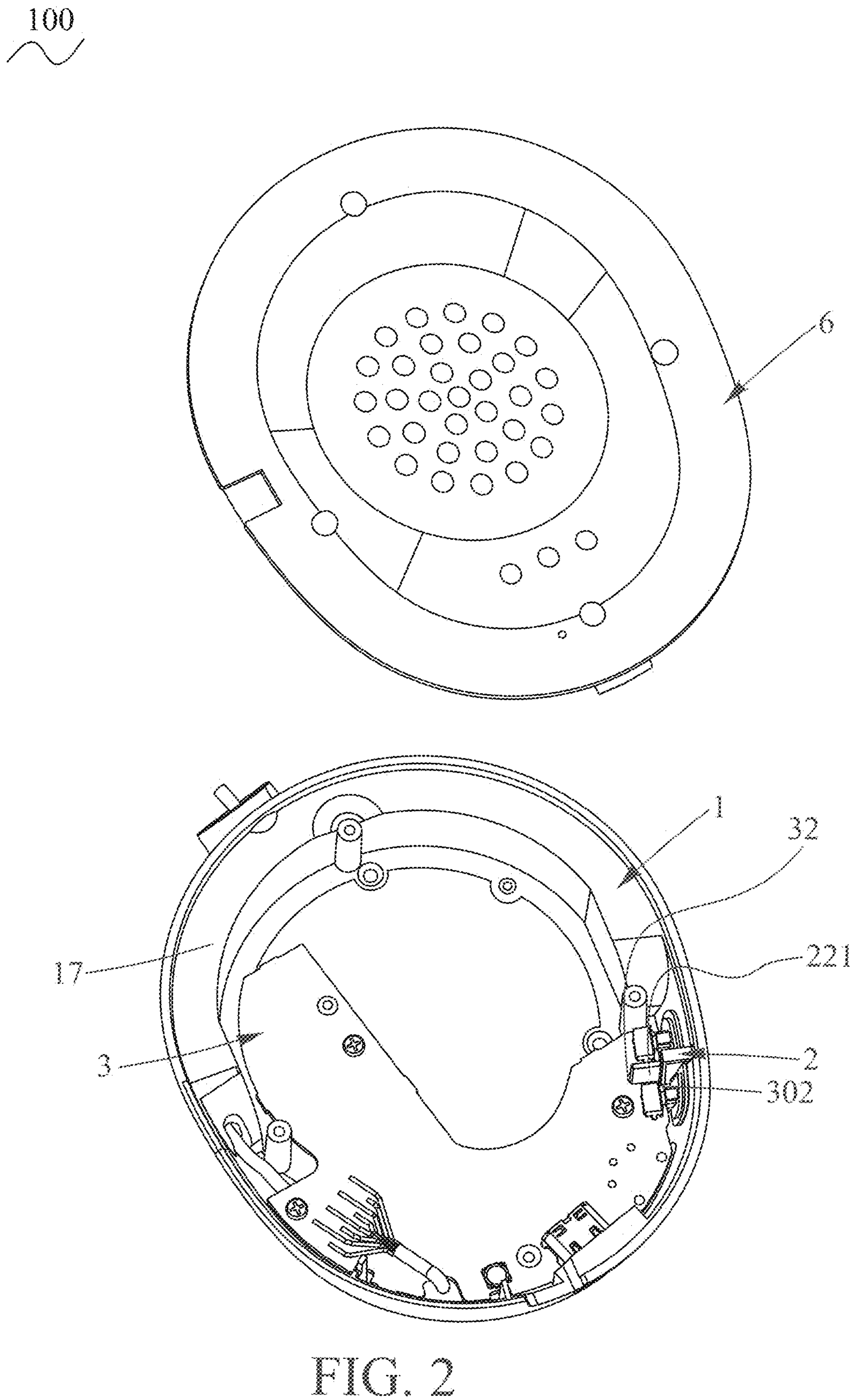
FIG. 2 is a partially exploded view of the headphone in accordance with the present invention.
Figure 3:
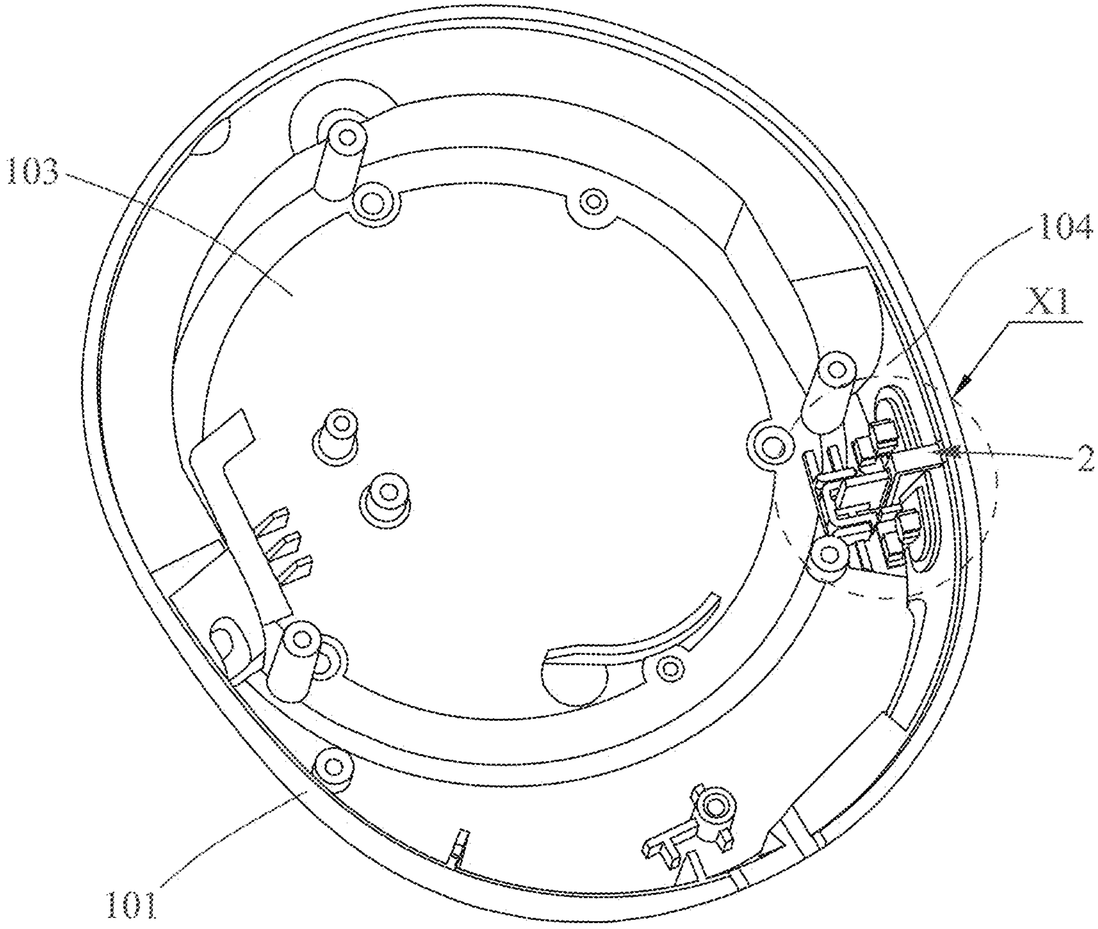
FIG. 3 is a partially perspective view of the headphone in accordance with the present invention.
Figure 4:
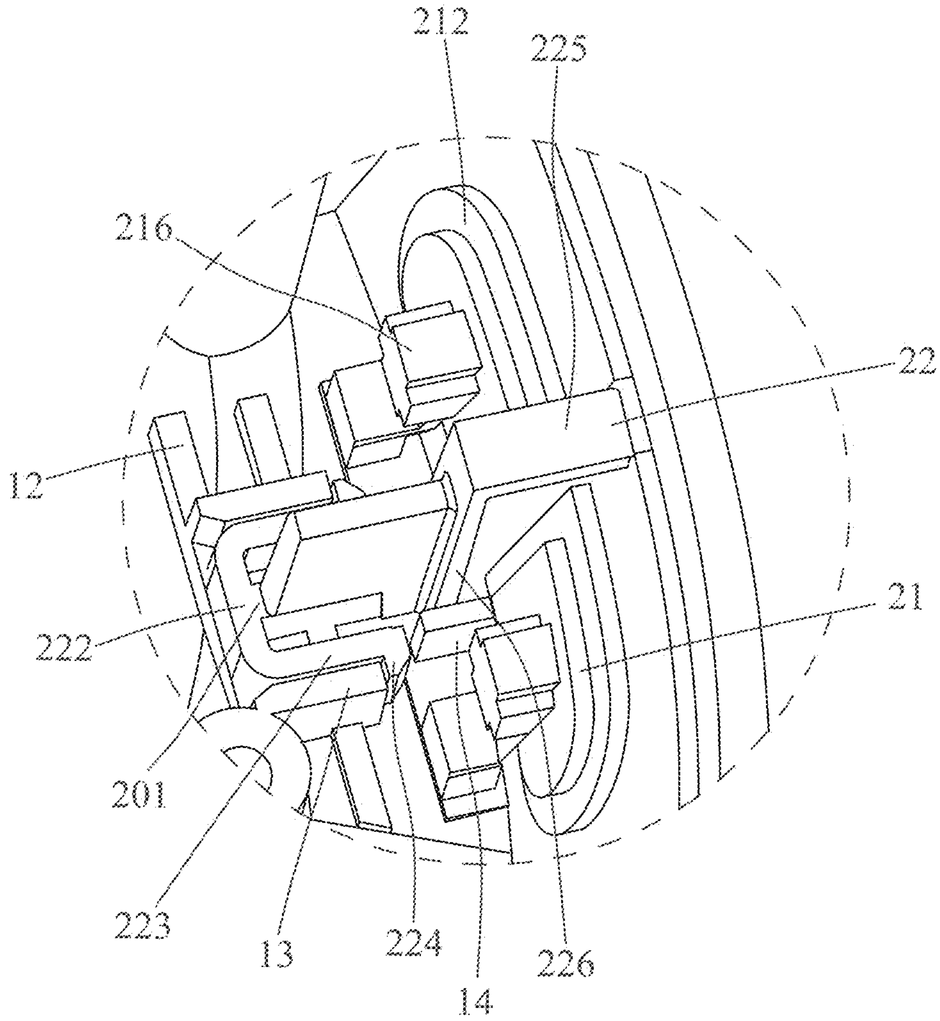
FIG. 4 is an enlarged view of an encircled portion X1 of the headphone of FIG. 3.

Referring to FIG. 1 to FIG. 5, a headphone 100 in accordance with the present invention is shown. The headphone 100 includes two earphone units 110, and a headband

120 connected between the two earphone units 110. Each earphone unit 110 includes an outer housing 1, a button module 2, a circuit board 3, a bracket 4, a cavity holder 5 and an inner housing 6.

The outer housing 1 and the inner housing 6 are assembled to form a housing 107. The housing 107 includes the outer housing 1 and the inner housing 6. An inside of the outer housing 1 is hollow. An inside of the housing 107 defines an accommodating space 10 for accommodating the button module 2, the circuit board 3 and the cavity holder 5. The accommodating space 10 is formed between the outer housing 1 and the inner housing 6. The bracket 4 is attached to an upper portion of the housing 107. The bracket 4 is connected to the upper portion of the housing 107. The button module 2 is mounted in the accommodating space 10 of the housing 107, and the button module 2 partially protrudes outside from one side of the outer housing 1 of the housing 107. The circuit board 3 is mounted in the outer housing 1 of the housing 107. The circuit board 3 is mounted in the accommodating space 10 of the housing 107. The bracket 4 is disposed on top of the housing 107. The cavity holder 5 is positioned in the accommodating space 10 of the housing 107. The inner housing 6 is assembled with the outer housing 1 to enclose the accommodating space 10. The headphone 100 sequentially includes the outer housing 1, the bracket 4, the button module 2, the circuit board 3, the cavity holder 5 and the inner housing 6 from an outside to an inside. The bracket 4, the button module 2, the circuit board 3 and the cavity holder 5 are accommodated in the accommodating space 10. The cavity holder 5 is mounted between the circuit board 3 and the inner housing 6.

Referring to FIG. 2 to FIG. 12, the outer housing 1 and the inner housing 6 together surround the accommodating space 10. The outer housing 1 has a button hole 11, a reinforcing rib 12, two first retaining walls 13, two second retaining walls 14, a first notch 15, a second notch 16, a peripheral wall 101, an outer wall 102, an interior surface 103, an inner periphery surface 104, an external surface 105 and an outer periphery surface 106. The peripheral wall 101 is formed in a circular shape. The outer wall 102 is connected with an outer periphery of the peripheral wall 101, so that the inside of the outer housing 1 forms an outer portion of the accommodating space 10, and the outer portion of the accommodating space 10 forms an opening 17 penetrating through an inner side of the outer housing 1. The opening 17 is communicated between the inside of the outer housing 1 and an outside. The button module 2, the circuit board 3 and the cavity holder 5 are assembled in the accommodating space 10 through the opening 17. An inner surface of the outer wall 102 is defined as the interior surface 103. An outer surface of the outer wall 102 is defined as the external surface 105. An inner surface of the peripheral wall 101 is defined as the inner periphery surface 104. An outer surface of the peripheral wall 101 is defined as the outer periphery surface 106. The bracket 4 is arranged on top of the outer wall 102, and the bracket 4 is attached to the outer periphery surface 106 of the outer housing 1. The inner periphery surface 104 is connected with a periphery of the interior surface 103. The inner housing 6 is covered to the peripheral wall 101 of the outer housing 1. The inner housing 6 covers the opening 17 of the outer housing 1. The housing 107 has the button hole 11 penetrating through a sidewall of the housing 107. Several portions of an inner surface of the housing 107 protrude inward to form a plurality of hollow positioning pillars 109. Several portions of the interior surface 103 protrude inward to form the plurality of the hollow positioning pillars 109.

The button hole 11 penetrates through the inner periphery surface 104 and the outer periphery surface 106 of the outer housing 1. In the present invention, the button hole 11 is an elliptical hole penetrating through the peripheral wall 101. In a concrete implementation, a shape of the button hole 11 should be without being limited, the button hole 11 is able to be any shapes. The button module 2 is assembled in the button hole 11. The reinforcing rib 12 is extended from the interior surface 103 of the outer housing 1. The outer housing 1 has two reinforcing ribs 12. The two reinforcing ribs 12 are extended inward from the one side of the interior surface 103. The two reinforcing ribs 12 extend along an up-down direction. The two first retaining walls 13 are extended from the one side of the interior surface 103, and the two first retaining walls 13 cross the two reinforcing ribs 12. The two first retaining walls 13 extend in a direction which is the same as an assembling direction of the button module 2. The two first retaining walls 13 are perpendicular to the two reinforcing ribs 12. Two inner ends of two facing surfaces of the two first retaining walls 13 are gradually inclined inward and away from each other to form two avoiding surfaces 131. The two first retaining walls 13 are spaced from each other to form an interval 132 between the two first retaining walls 13. Two inner surfaces of the two first retaining walls 13 abut against the circuit board 3. An inner corresponding structure of the button module 2 is positioned between the two first retaining walls 13. In the present invention, the interior surface 103 is provided with the two reinforcing ribs 12, and the two first retaining walls 13 are extended between the two reinforcing ribs 12. The two reinforcing ribs 12 and the two first retaining walls 13 are adjacent to the button hole 11. The two first retaining walls 13 are corresponding to the button hole 11.

Two portions of the inner periphery surface 104 extend inward to form the two second retaining walls 14. The two second retaining walls 14 are spaced from each other. The two second retaining walls 14 are in alignment with a middle of the interval 132 between the two first retaining walls 13. A middle corresponding structure of the button module 2 is placed between the two second retaining walls 14. The two second retaining walls 14 are placed between the button hole 11 and the interior surface 103. The two second retaining walls 14 abut against the circuit board 3. The inner surface of the housing 107 protrudes inward to form a protruding platform 108. The interior surface 103 protrudes inward to form the protruding platform 108. The protruding platform 108 is positioned between the interior surface 103 and the inner periphery surface 104. The protruding platform 108 is positioned among the interior surface 103, the two second retaining walls 14 and the inner periphery surface 104. The protruding platform 108 is positioned corresponding to the button hole 11. The protruding platform 108 is formed adjacent to the button hole 11. The protruding platform 108 is disposed adjacent to inner sides of the two reinforcing ribs 12 and the two first retaining walls 13.

The inner periphery surface 104 is recessed opposite to the circuit board 3 to form the first notch 15. The first notch 15 is connected to a middle of an inner side of the button hole 11. The first notch 15 is communicated with the button hole 11. A section of an outer corresponding structure of the button module 2 which is disposed away from the interior surface 103 is disposed in the first notch 15. The inner periphery surface 104 of the outer housing 1 is recessed opposite to the circuit board 3 to form the second notch 16. The second notch 16 is formed between the two second retaining walls 14. The second notch 16 is connected to a middle of an outer side of the button hole 11. The second notch 16 is communicated with the button hole 11. The other section of the outer corresponding structure of the button module 2 which is disposed next to the interior surface 103 is located in the second notch 16. The first notch 15 and the second notch 16 are located at the inner side and the outer side of the button hole 11 which are opposite to each other.

Figure 5:
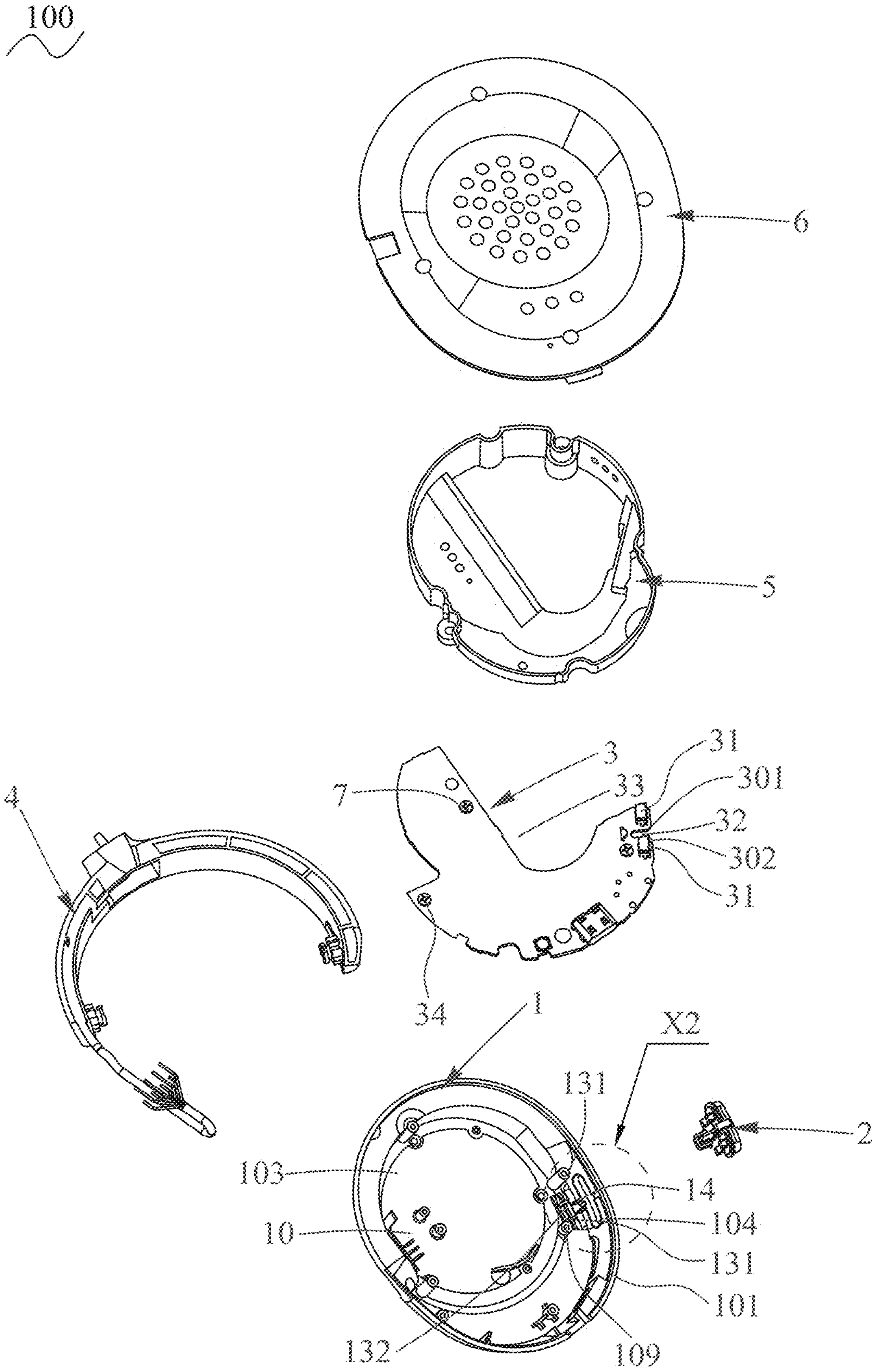
FIG. 5 is an exploded view of the headphone in accordance with the present invention.
Figure 6:
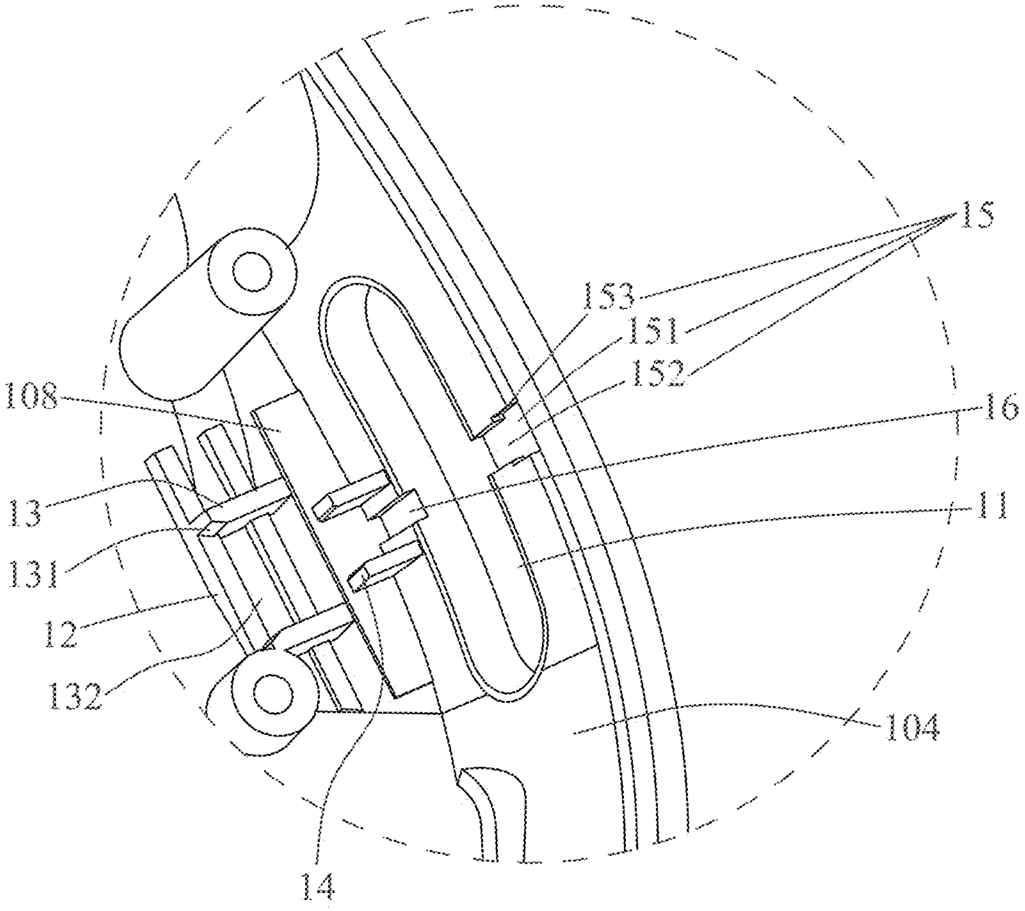
FIG. 6 is an enlarged view of an encircled portion X2 of the headphone of FIG. 5.
Figure 7:
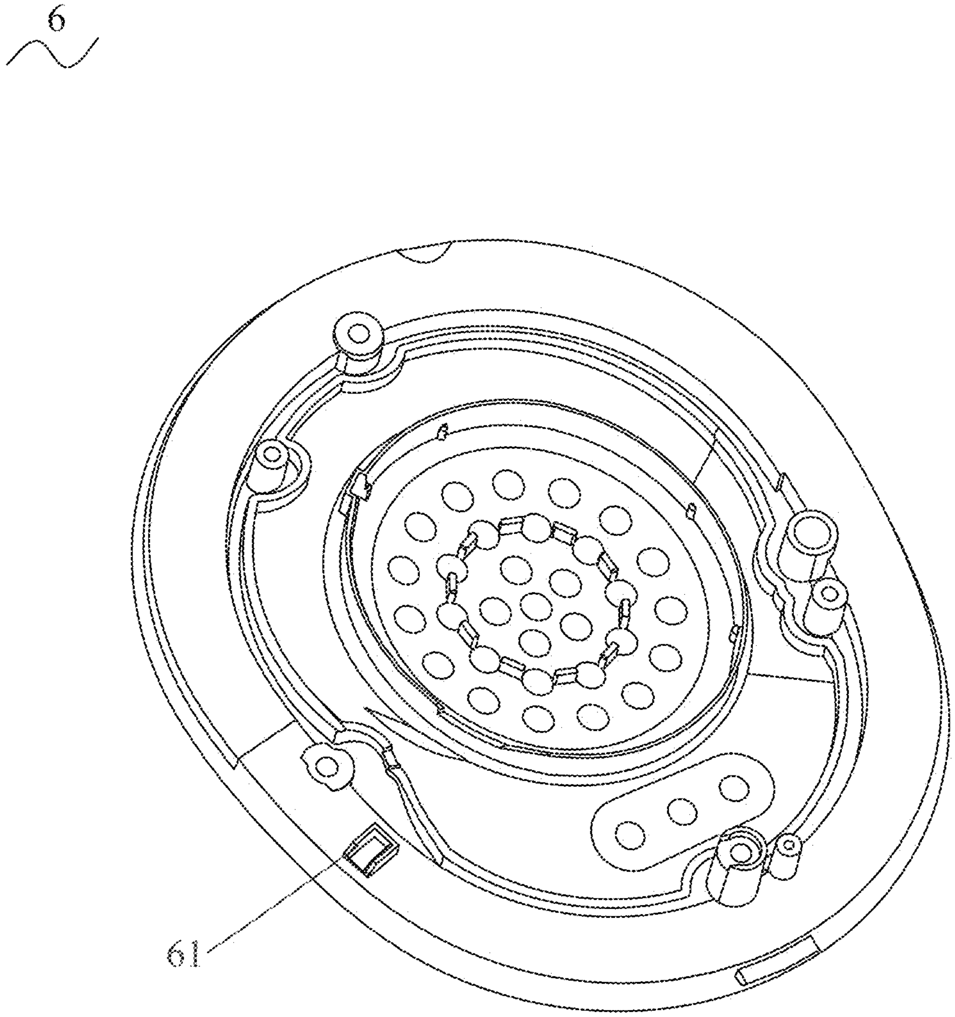
FIG. 7 is a perspective view of an inner housing of the headphone in accordance with the present invention.
Figure 8:
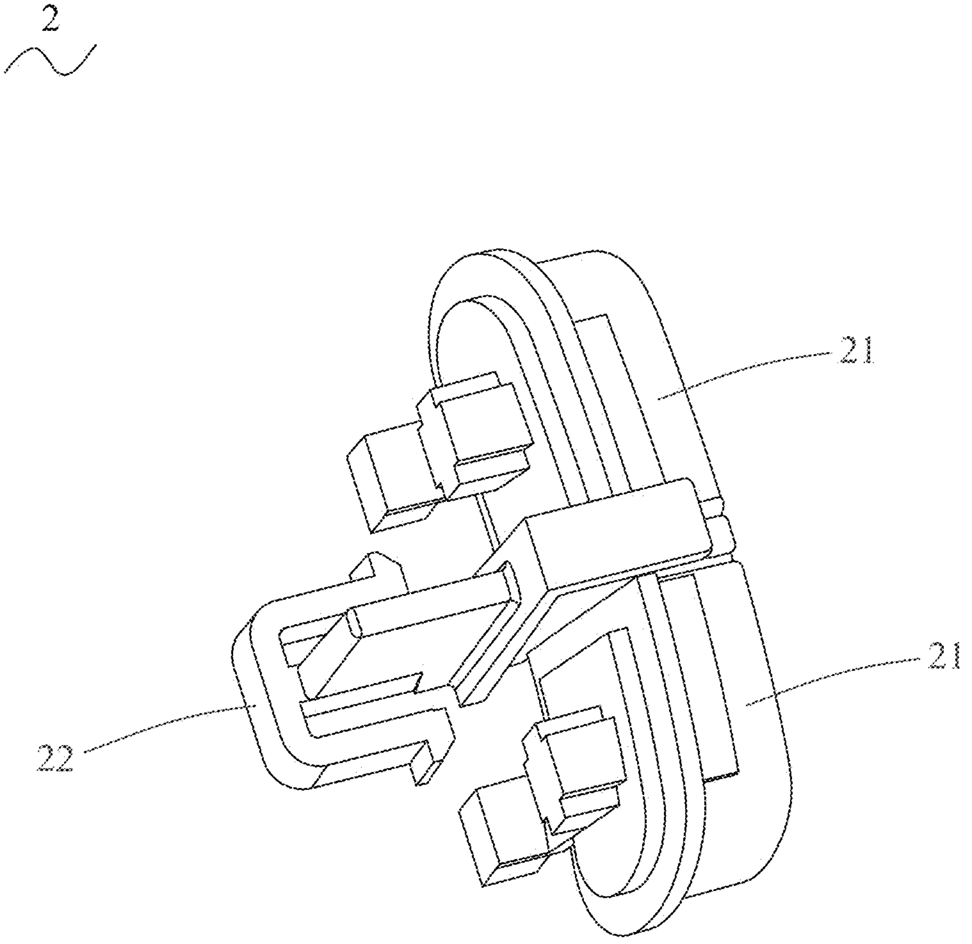
FIG. 8 is a perspective view of a button module of the headphone in accordance with the present invention.
Figure 9:
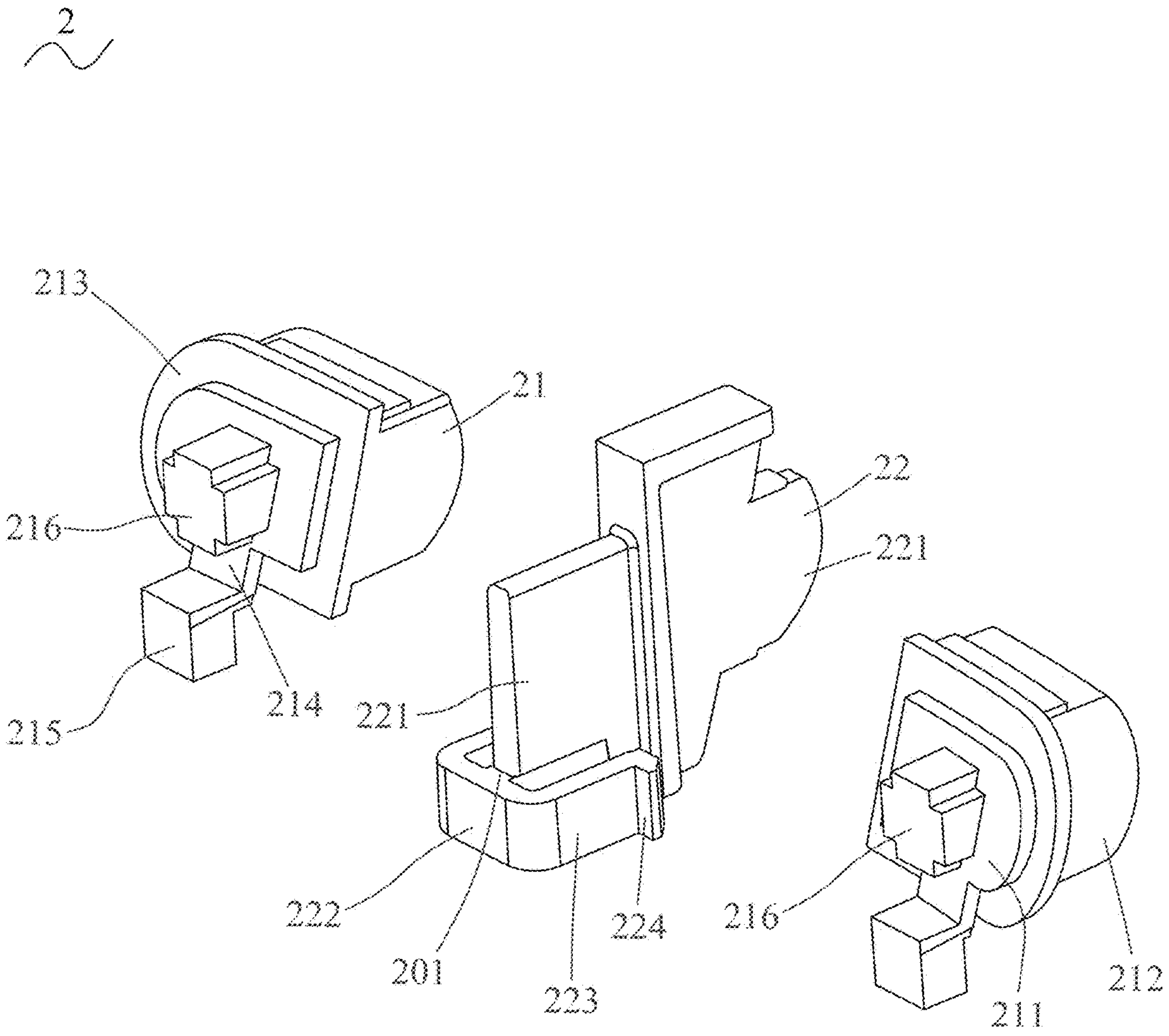
FIG. 9 is an exploded view of the button module of the headphone of FIG. 8.
Figure 10:
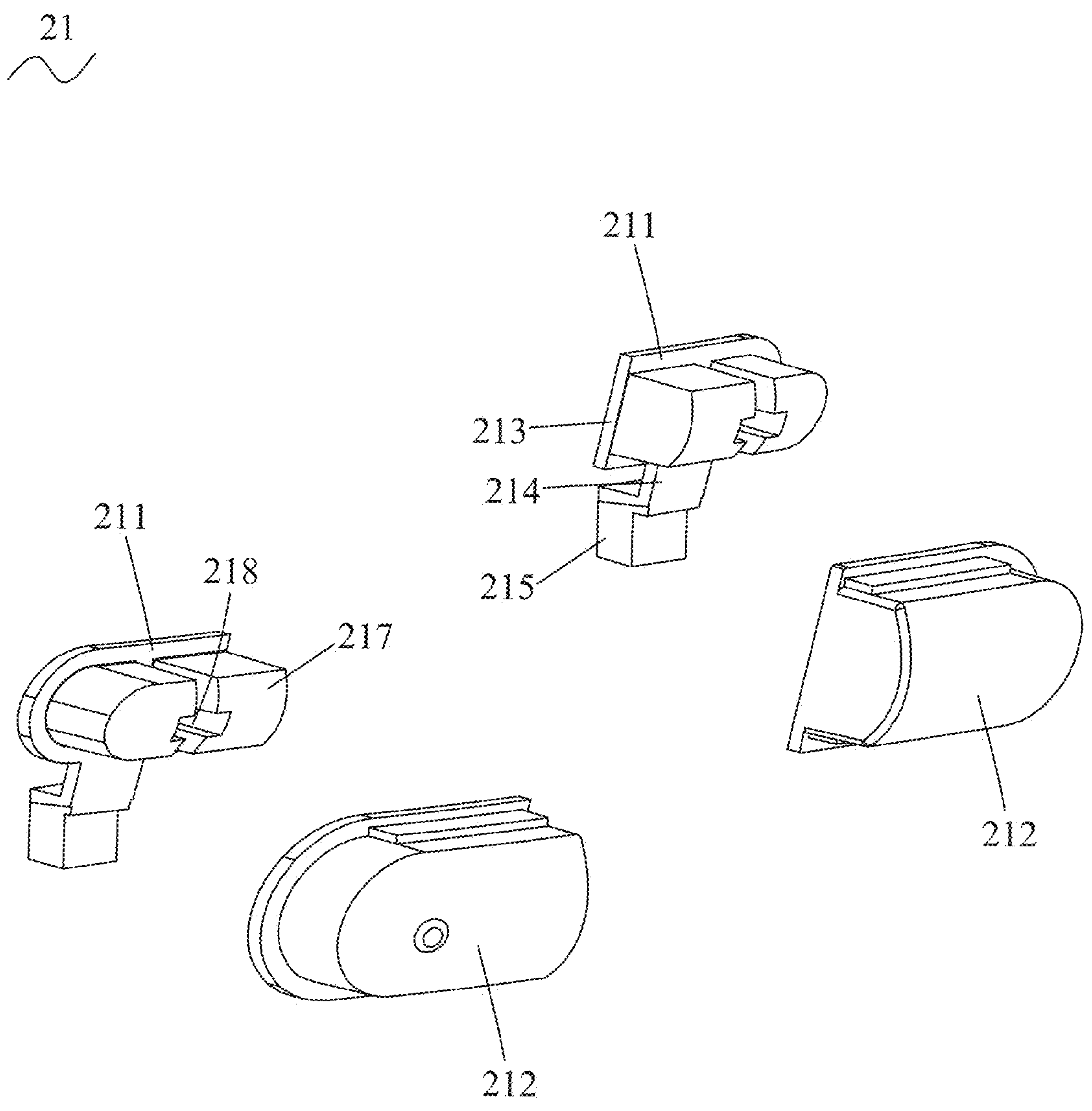
FIG. 10 is an exploded view of a push button of the headphone in accordance with the present invention.
Figure 11:
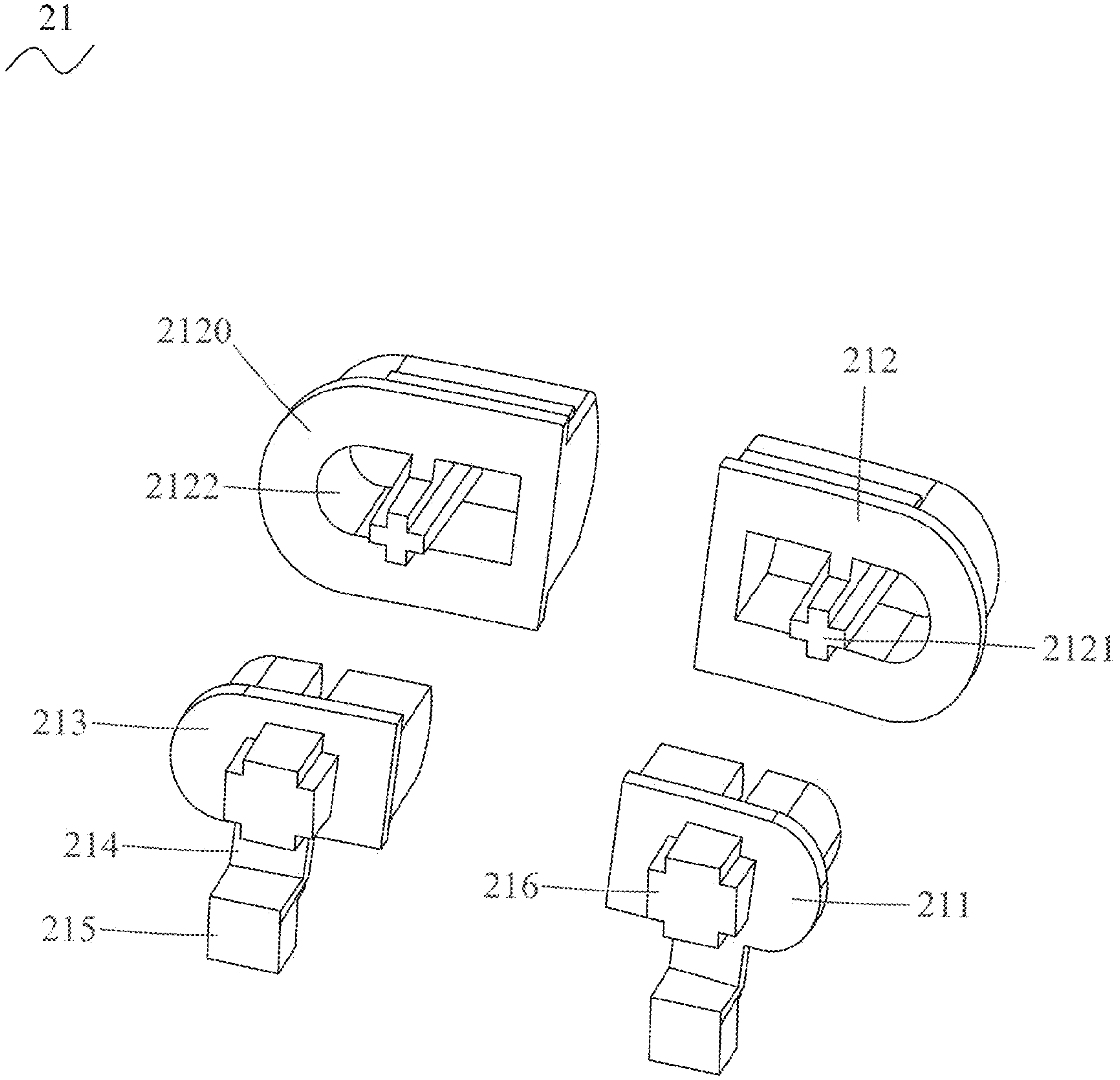
FIG. 11 is another exploded view of the push button of the headphone in accordance with the present invention.
Figure 12:
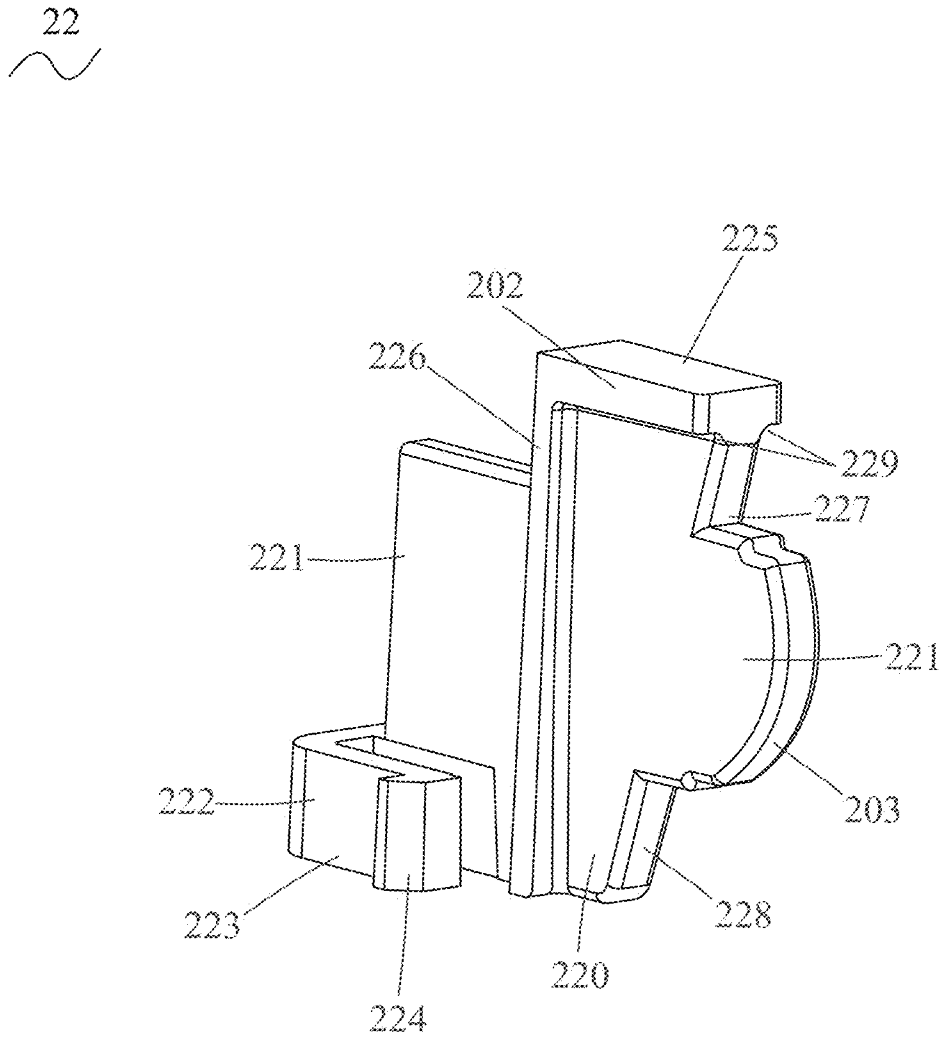
FIG. 12 is a perspective view of a light guiding unit in accordance with the present invention.
Figure 13:
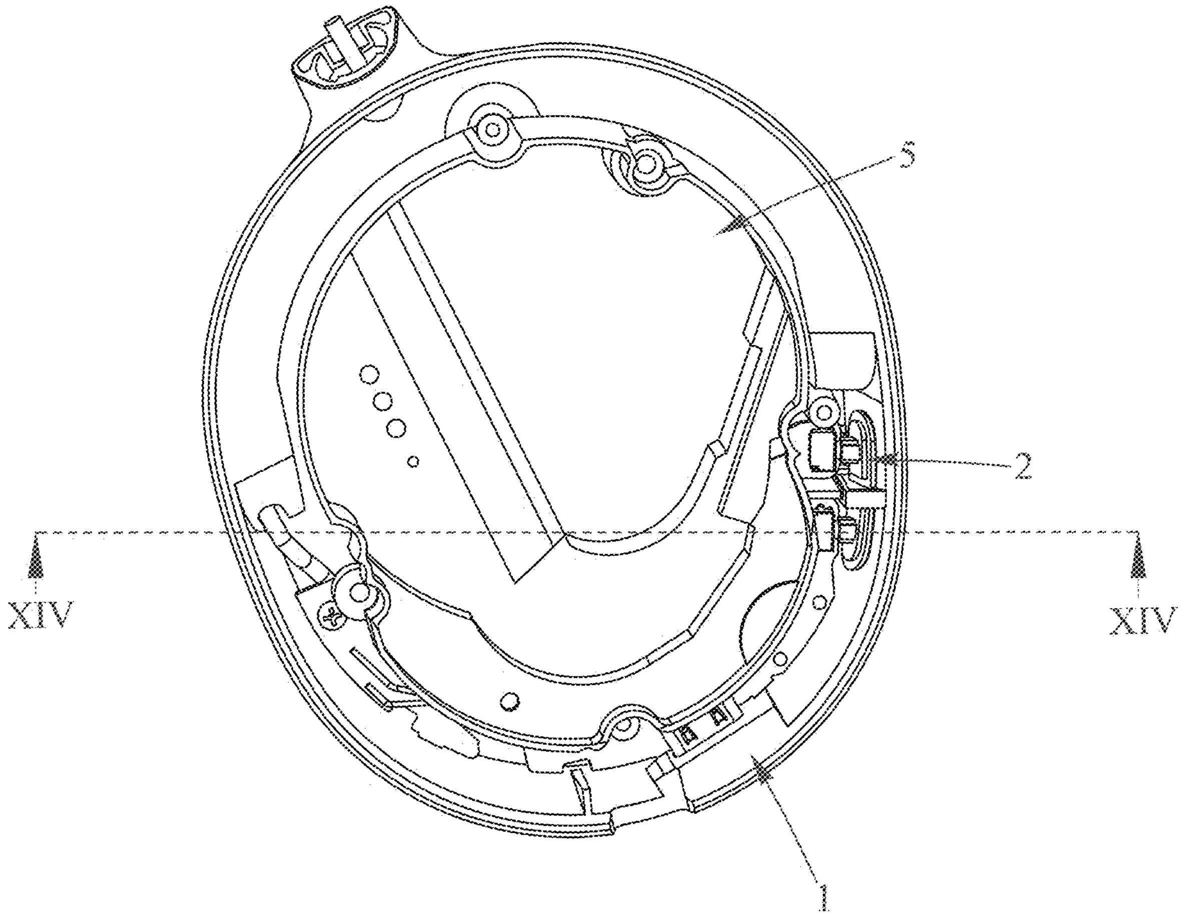
FIG. 13 is a schematic diagram of the headphone according to the present invention.
Figure 14:
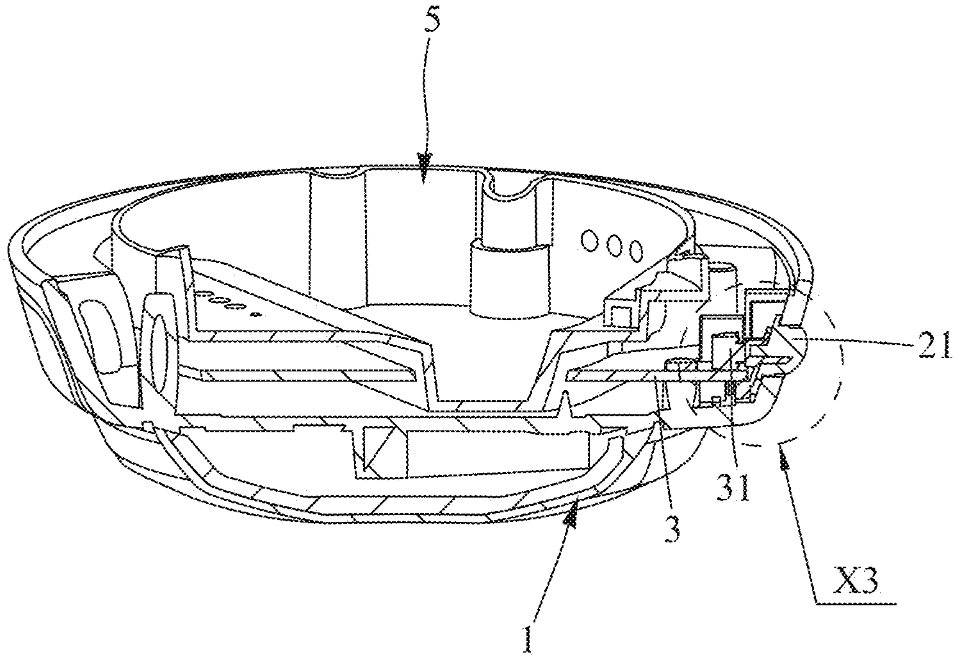
FIG. 14 is a cross-sectional view of the headphone along a line XIV-XIV of FIG. 13.
Figure 15:
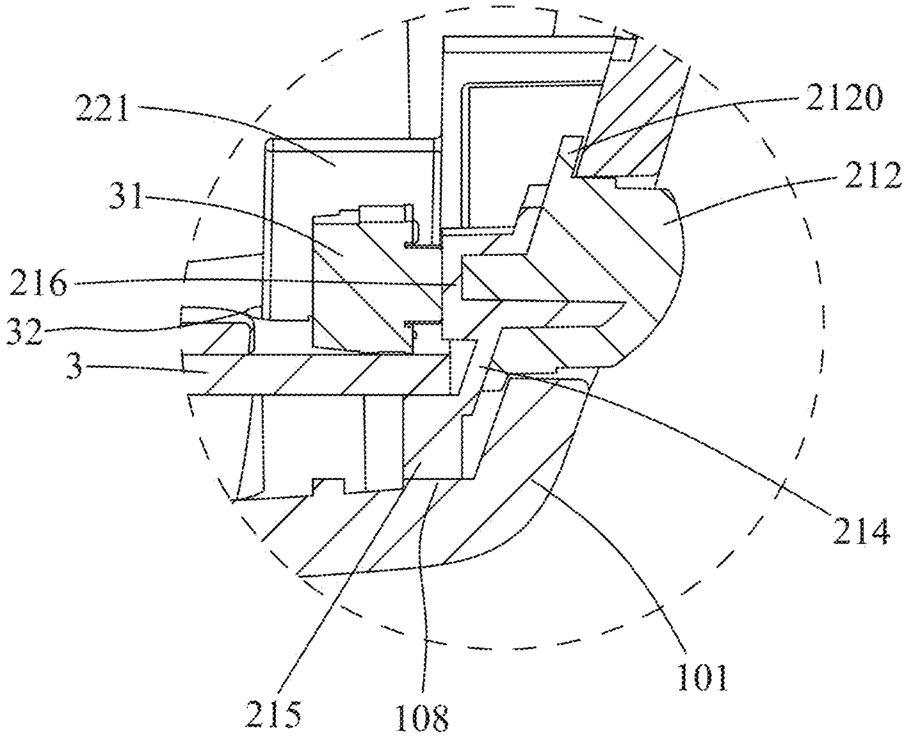
FIG. 15 is an enlarged view of an encircled portion X3 of the headphone of FIG. 14.
Figure 16:
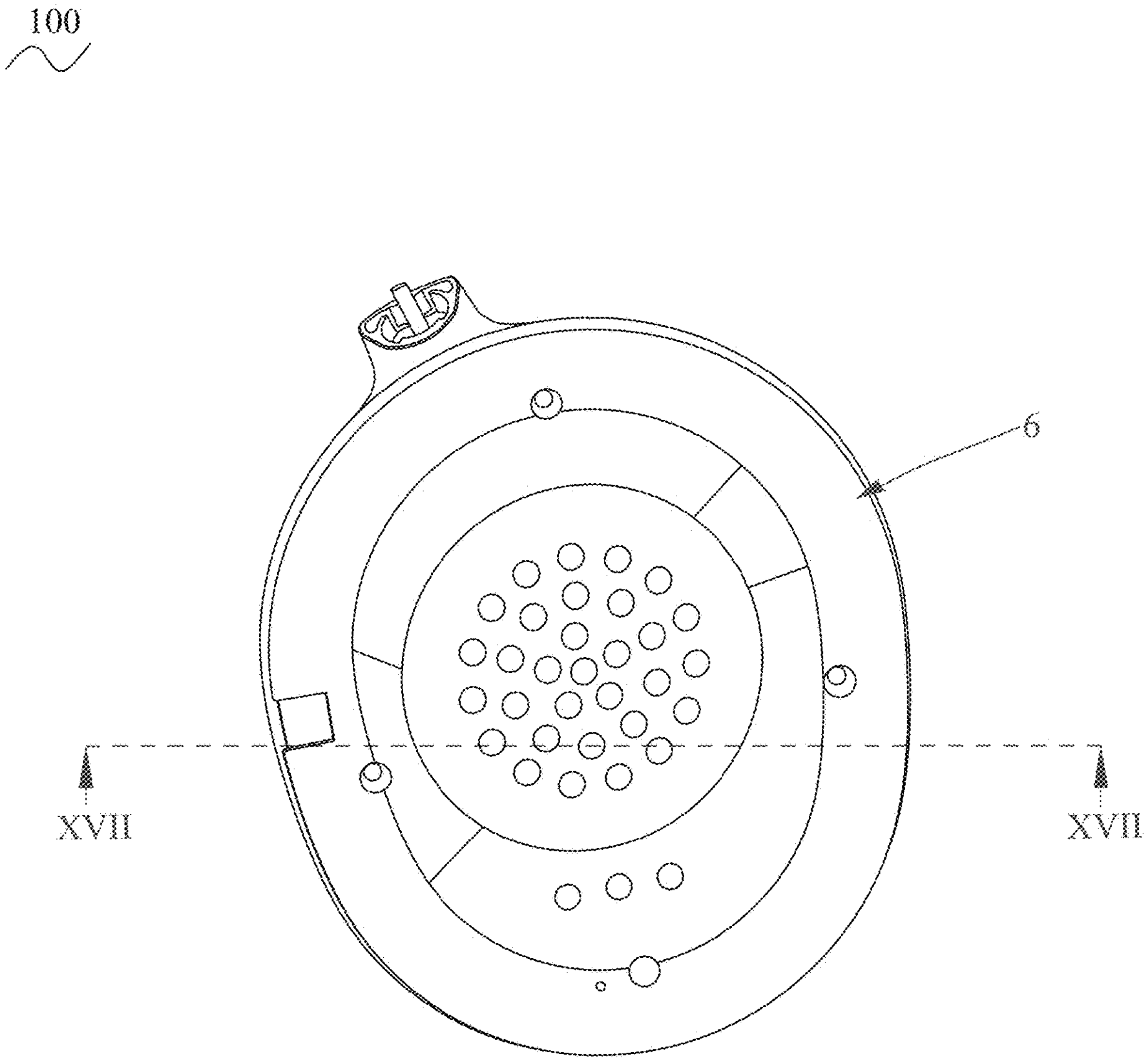
FIG. 16 is another schematic diagram of the headphone in accordance with the present invention.
Figure 17:
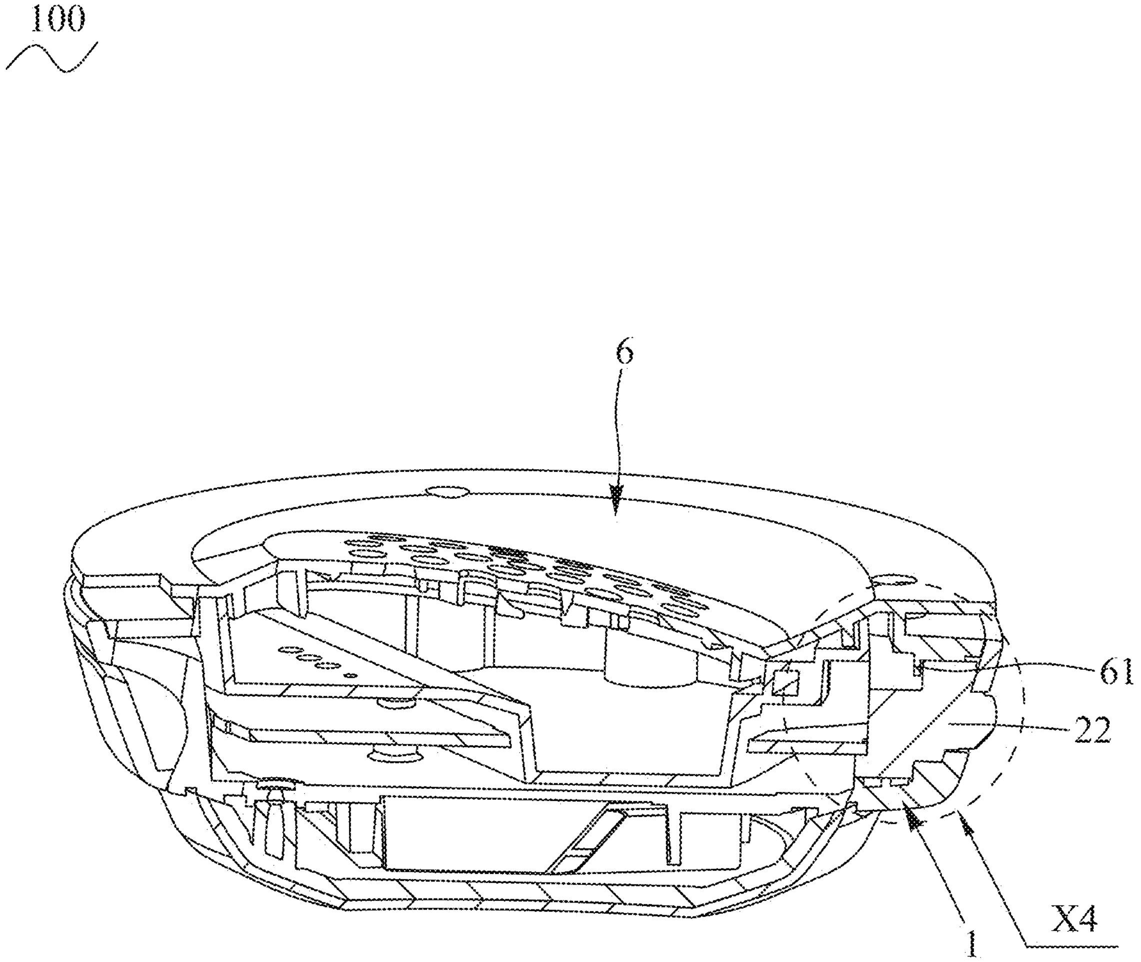
FIG. 17 is a cross-sectional view of the headphone along a line XVII-XVII of FIG. 16.
Figure 18:
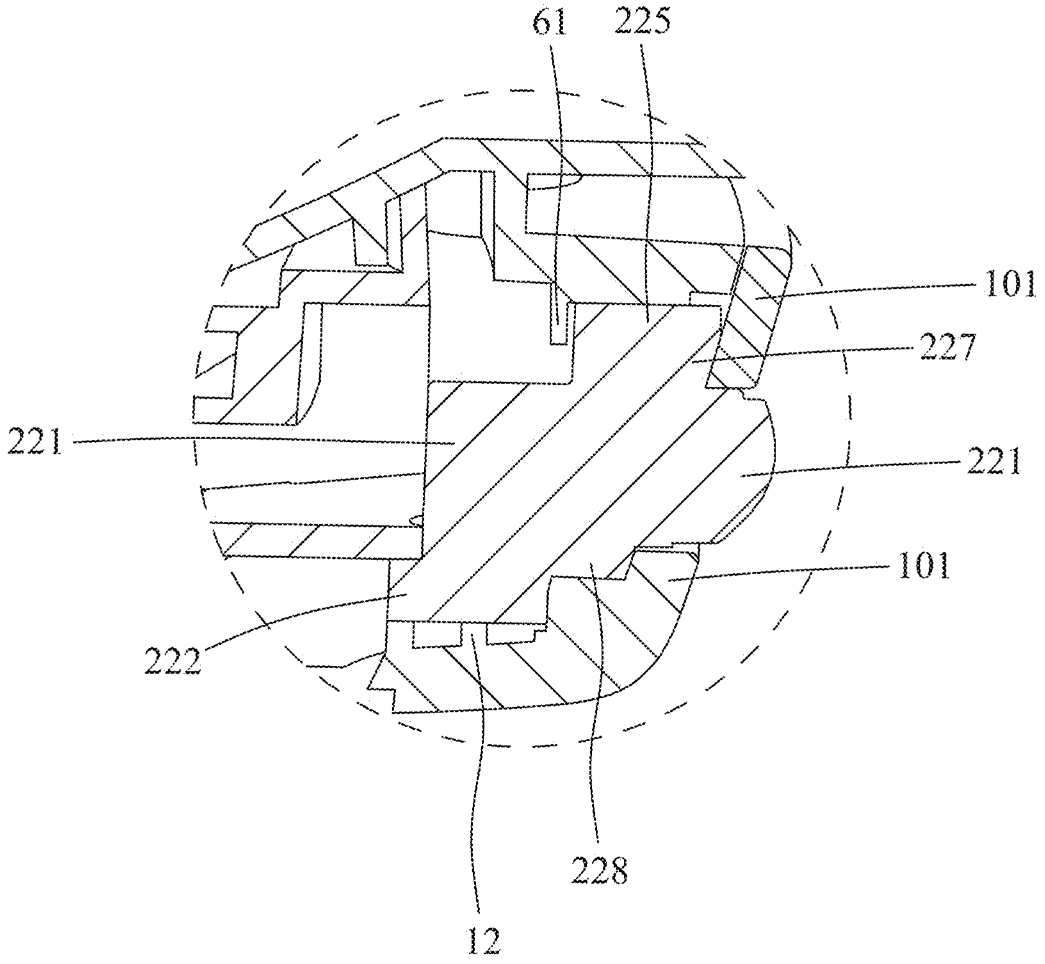
FIG. 18 is an enlarged view of an encircled portion X4 of the headphone of FIG. 17.
Figure 19:
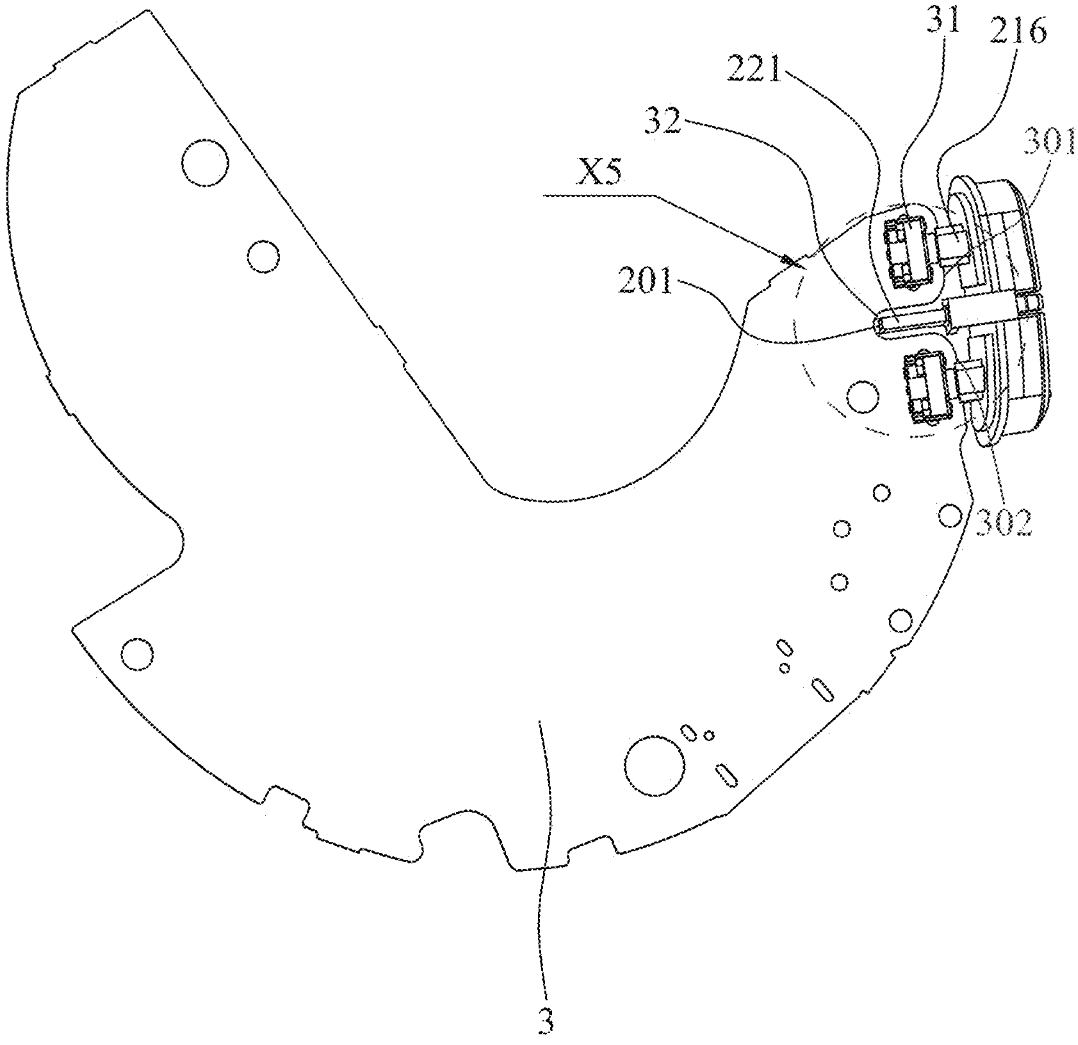
FIG. 19 is a partial diagram of the headphone according to the present invention.
Figure 20:
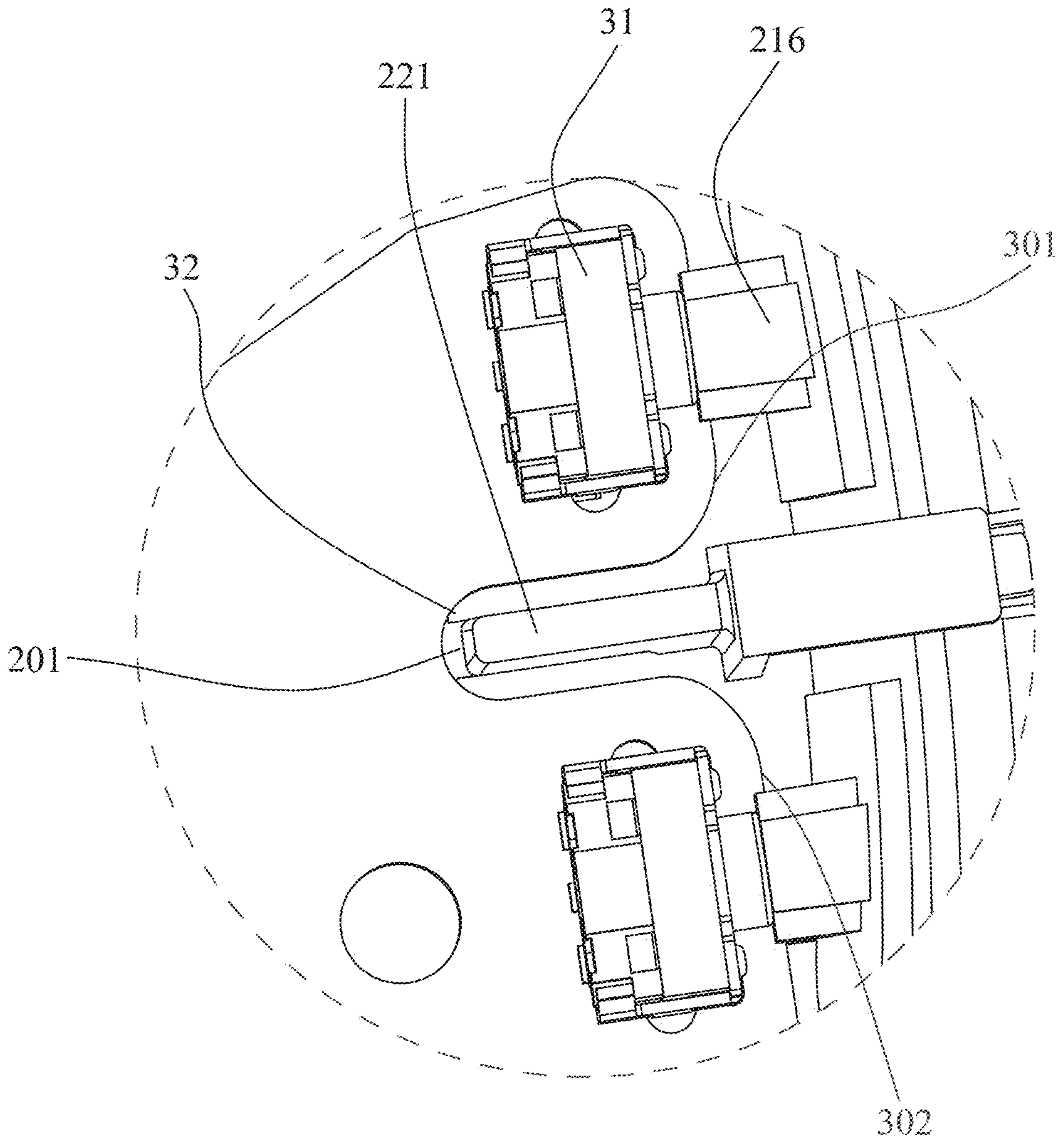
FIG. 20 is an enlarged view of an encircled portion X5 of the headphone of FIG. 19 . . .

Referring to FIG. 5 and FIG. 6, the first notch 15 has a first recess 151, a second recess 152 and two stopping portions 153. An inner side of the first notch 15 is defined as the first recess 151 which is recessed opposite to the circuit board 3 in the inner periphery surface 104. A middle of one side of the first recess 151 which is adjacent to the button hole 11 extends to the middle of the inner side of the button hole 11 to form the second recess 152. The second recess 152 is connected between a middle of the first recess 151 and the middle of the inner side of the button hole 11. A width of the first recess 151 is wider than a width of the second recess 152. The first recess 151 is communicated with the second recess 152. An upper wall and a lower wall of the second recess 152 are defined as the two stopping portions 153. Two inner surfaces of the two stopping portions 153 are located at two junction areas between the first recess 151 and the second recess 152. The section of the outer corresponding structure of the button module 2 which is disposed away from the interior surface 103 is positioned corresponding to the two stopping portions 153. The second recess 152 is communicated with the button hole 11.

Referring to FIG. 5 to FIG. 13, the button module 2 includes two push buttons 21 and a light guiding unit 22. The light guiding unit 22 is positioned between the two push buttons 21. Each push button 21 includes a button body 211 and a button cap 212. The button cap 212 is mounted to an outer end of the button body 211. The button cap 212 is combined with the button body 211 by an injection molding technology. The button module 2 is mounted in the outer housing 1. The two push buttons 21 are mounted in the outer housing 1 of the housing 107. The two push buttons 21 penetrate through the button hole 11. The two push buttons 21 partially pass through the button hole 11. The button body 211 is mounted in the outer housing 1 of the housing 107. The button cap 212 penetrates through the button hole 11 of the outer housing 1 of the housing 107. The button cap 212 is fixed to the button hole 11 of the outer housing 1. The two button caps 212 of the two push buttons 21 are located to the button hole 11 of the outer housing 1 of the housing 107 by the light guiding unit 22. The two button caps 212 of the two push buttons 21 are located to an upper surface and a lower surface of the light guiding unit 22. The light guiding unit 22 is located between the two push buttons 21. The button body 211 is placed between the peripheral wall 101 of the outer housing 1 and the circuit board 3. In the present invention, the two push buttons 21 are a power key and a Bluetooth key. In the concrete implementation, the two push button 21 are without being limited to be the power key and the Bluetooth key. In the present invention, the two push buttons 21 are made of thermoplastic polyurethane (TPU). In the concrete implementation, the two push buttons 21 are without being limited to be made of thermoplastic polyurethane (TPU).

The button body 211 has a base board 213, an elastic portion 214, a retaining portion 215, a pressing portion 216, an inserting end 217 and a positioning groove 218. A middle of an outer side of the base board 213 slantwise extends towards the circuit board 3 and the inner surface of the housing 107 to form the elastic portion 214. The middle of the outer side of the base board 213 slantwise extends towards the circuit board 3 and the interior surface 103 to form the elastic portion 214. The elastic portion 214 is positioned to one end of the circuit board 3. The retaining portion 215 is extended inward and then is extended towards the inner surface of the housing 107 from an inner end of the button body 211. An outer side of the elastic portion 214 extends inward and protrudes towards the inner surface of the housing 107 to form the retaining portion 215. The outer side of the elastic portion 214 extends inward and protrudes towards the interior surface 103 to form the retaining portion 215. The elastic portion 214 is connected between the base board 213 and the retaining portion 215. An inner surface of the retaining portion 215 abuts against the circuit board 3. An outer surface of the retaining portion 215 abuts against the protruding platform 108. Two opposite surfaces of the retaining portion 215 abut against the circuit board 3 and the protruding platform 108, respectively. The retaining portion 215 is fastened between the circuit board 3 and the protruding platform 108. A free side of the elastic portion 214 which is adjacent to the interior surface 103 extends inward and then extends towards the interior surface 103 to form the retaining portion 215. The retaining portion 215 is placed between the circuit board 3 and the protruding platform 108. The retaining portion 215 is clamped between the circuit board 3 and the protruding platform 108.

When the push button 21 is pressed inward, the retaining portion 215 ensures that the push button 21 moves stably. The pressing portion 216 is extended inward from an inner surface of the button body 211. The retaining portion 215 is extended inward and then is extended towards the interior surface 103 from the inner end of the button body 211. The pressing portion 216 is spaced from the retaining portion 215. The pressing portion 216 is extended inward from an inner surface of the base board 213 of the button body 211. The pressing portion 216 contacts with a corresponding component of the circuit board 3. An outer surface of the base board 213 protrudes outward and opposite to the pressing portion 216 to form the inserting end 217. The inserting end 217 is inserted into a corresponding groove of the push button 21 to realize that the button body 211 is located to the button cap 212 and that the button body 211 is fastened to the button cap 212. The inserting end 217 is combined with the button cap 212. A middle of the inserting end 217 is recessed inward to form the positioning groove 218. The positioning groove 218 is cross-shaped. A corresponding construction of the push button 21 is inserted into the positioning groove 218 to realize that the button cap 212 is located to the button body 211 and that the button cap 212 is fixed to the button body 211.

The button cap 212 has a base portion 2120, a positioning block 2121 and a locating groove 2122. A middle of an inner surface of the base portion 2120 is recessed opposite to the pressing portion 216 of the push button 21 to form the locating groove 2122. A middle of an inner end of the base portion 2120 protrudes inward to form the positioning block 2121. The positioning block 2121 is cross-shaped. The positioning block 2121 is matched with the positioning groove 218. The positioning block 2121 is formed in the locating groove 2122. The positioning block 2121 projects out of the locating groove 2122. The inserting end 217 is inserted into the locating groove 2122, and the positioning block 2121 is inserted into the positioning groove 218 to realize that the button cap 212 is located to the button body 211 and that the button cap 212 is fixed to the button body 211. The inner surface of the base portion 2120 is connected with the base board 213 of the button body 211. A periphery of an outer end of the base portion 2120 abuts against the inner periphery surface 104 of the outer housing 1. A middle of the outer end of the base portion 2120 projects beyond the periphery of the outer end of the base portion 2120. The base portion 2120 is disposed in the button hole 11. The middle of the outer end of the base portion 2120 passes through the button hole 11, and the middle of the outer end of the base portion 2120 is exposed to the outer periphery surface 106 of the outer housing 1 through the button hole 11. The corresponding groove of the push button 21 is the locating groove 2122. The corresponding construction of the push button 21 is the positioning block 2121.

The light guiding unit 22 is mounted in the outer housing 1 of the housing 107, and the light guiding unit 22 partially penetrates through the button hole 11. The light guiding unit 22 has a guiding board 220, a guiding body 221, a supporting base 222, two fixing arms 223, two hooks 224, a first reinforcing portion 225, two second reinforcing portions 226, a first ramp 227, a second ramp 228 and two curving portions 229. The guiding body 221 partially passes through a middle of the button hole 11, and the guiding body 221 is partially exposed to the outer periphery surface 106 of the outer housing 1. An outer portion of the guiding body 221 protrudes towards the inner surface of the housing 107 to form the guiding board 220. The outer portion of the guiding body 221 protrudes towards the interior surface 103 to form the guiding board 220. The guiding board 220 and the guiding body 221 form a board shape. An inner end of the guiding board 220 is positioned between the two first retaining walls 13. The inner corresponding structure of the button module 2 is the guiding board 220.

An inner surface of the guiding board 220 protrudes inward to form a propping portion 201. The propping portion 201 is protruded for a short distance from the inner surface of the guiding board 220. An inner surface of the propping portion 201 protrudes inward, and then extend upward and downward to form the supporting base 222. The supporting base 222 extends perpendicular to the propping portion 201 and the guiding board 220. The guiding board 220 and the supporting base 222 are connected by the propping portion 201. The guiding board 220 is connected with a middle of the supporting base 222 by the propping portion 201. The propping portion 201 is extended from the inner surface of the guiding board 220 to the supporting base 222. The supporting base 222 is clamped by the two first retaining walls 13. The two avoiding surfaces 131 avoid the two first retaining walls 13 from contacting the supporting base 222. An upper portion of the supporting base 222 and a lower portion of the supporting base 222 are bent outward to form the two fixing arms 223. The supporting base 222 and the two fixing arms 223 form a lying U shape. The guiding board 220 and the guiding body 221 are connected with the middle of the supporting base 222 by the propping portion 201. A junction between a top of the supporting base 222 and one fixing arm 223 forms an arc shape. A junction between a bottom of the supporting base 222 and the other fixing arm 223 forms the arc shape. The two fixing arms 223 abut against the two facing surfaces of the two first retaining walls 13. Two outer ends of the two fixing arms 223 oppositely protrude perpendicular to the two fixing arms 223 to form the two hooks 224. The two hooks 224 hook two outer end surfaces of the two first retaining walls 13 to prevent the light guiding unit 22 breaking away from the assembling direction. Two inner surfaces of the two hooks 224 face towards the two outer end surfaces of the two first retaining walls 13. The two inner surfaces of the two hooks 224 are matched with the two outer end surfaces of the two first retaining walls 13. The two inner surfaces of the two hooks 224 are blocked by the two outer end surfaces of the two first retaining walls 13. The circuit board 3 abuts against the supporting base 222 of the light guiding unit 22 to locate the light guiding unit 22 between the circuit board 3 and the interior surface 103 of the outer housing 1.

A middle of an inner portion of the guiding body 221 protrudes opposite to the guiding board 220 to form the first reinforcing portion 225. The first reinforcing portion 225 is placed in a corresponding area of the inner housing 6 for fastening the light guiding unit 22. A junction between an upper portion of the first reinforcing portion 225 and the guiding body 221 is curved inward to form one curving portion 229. A junction between a lower portion of the first reinforcing portion 225 and the guiding body 221 is curved inward to form the other curving portion 229. The upper portion of the first reinforcing portion 225 and the lower portion of the first reinforcing portion 225 protrude beyond an upper surface of the guiding body 221 and a lower surface of the guiding body 221 to form two blocking portions 202. The two blocking portions 202 are blocked by the two stopping portions 153 of the first notch 15 of the outer housing 1. The two curving portions 229 contact with the two stopping portions 153 of the first notch 15 of the outer housing 1. One second reinforcing portion 226 is perpendicularly extended from an upper surface of the guiding board 220 and the upper surface of the guiding body 221. The other second reinforcing portion 226 is perpendicularly extended from a lower surface of the guiding board 220 and a lower surface of the guiding body 221. The two second reinforcing portions 226 are connected to an inner end of the first reinforcing portion 225. The two second reinforcing portions 226 are connected to two inner ends of the two blocking portions 202. The two second reinforcing portions 226 and an outer end of the guiding board 220 are disposed between the two second retaining walls 14, and the two second reinforcing portions 226 contact with two facing surfaces of the two second retaining walls 14 to fasten the light guiding unit 22. The light guiding unit 22 is disposed between the two first retaining walls 13 and the two second retaining walls 14 to locate the light guiding unit 22. The first reinforcing portion 225 and the two second reinforcing portions 226 are used for reinforcing a locating performance of the light guiding unit 22. The middle corresponding structure of the button module 2 includes the two second reinforcing portions 226.

One side of an outer surface of the guiding body 221 slantwise extends outward and opposite to the interior surface 103 to form the first ramp 227. The other side of the outer surface of the guiding body 221 is arched outward to form a convex portion 203. An outer surface of the guiding board 220 which is away from the first ramp 227 slantwise extends inward and towards the interior surface 103 to form the second ramp 228. The first ramp 227 and the second ramp 228 are isolated by the convex portion 203. The convex portion 203 projects out of the middle of the button hole 11. The first ramp 227 of the light guiding unit 22 is fastened in the first notch 15 of the outer housing 1 to realize that the light guiding unit 22 is located to the outer housing 1 and that the light guiding unit 22 is fixed in the outer housing 1. The second ramp 228 of the light guiding unit 22 is fastened in the second notch 16 of the outer housing 1 to realize that the light guiding unit 22 is located to the outer housing 1 and that the light guiding unit 22 is fixed in the outer housing 1. The first notch 15 and the second notch 16 are configured to position the light guiding unit 22. The guiding body 221 of the light guiding unit 22 is positioned between the two push buttons 21.

The circuit board 3 is equipped with two switches 31 and an inserting slot 32. The two switches 31 are mounted at one end of an inner surface of the circuit board 3 which is adjacent to the button hole 11. A quantity of the switches 31 equals to a quantity of push buttons 21. The two switches 31 are positioned corresponding to the pressing portions 216 of the two push buttons 21. An edge of the circuit board 3 is recessed inward to form the inserting slot 32. An outer portion of an upper wall of the inserting slot 32 is curved upward and outward to form a first arc surface 301. An outer portion of a lower wall of the inserting slot 32 is curved downward and outward to form a second arc surface 302. The inserting slot 32 is formed between the two switches 31. The two push buttons 21 are disposed corresponding to the two switches 31. The inserting slot 32 is formed between the two push buttons 21. The guiding body 221 of the light guiding unit 22 is disposed in the inserting slot 32. The guiding body 221 of the light guiding unit 22 is inserted into the inserting slot 32 to locate the light guiding unit 22 between the circuit board 3 and the inner periphery surface 104 of the outer housing 1. The guiding body 221 of the light guiding unit 22 is spaced from an inner wall of the inserting slot 32 which faces towards the guiding body 221 by the propping portion 201. The propping portion 201 is positioned between circuit board 3 and the guiding body 221. The inner wall of the inserting slot 32 is shown as a curved shape. The first arc surface 301 and the second arc surface 302 are without contacting the light guiding unit 22. The edge of the circuit board 3 is arranged corresponding to the two elastic portions 214 of the two push buttons 21. The edge of the circuit board 3 is positioned between the pressing portions 216 and the retaining portions 215 of the two push buttons 21. The corresponding component of the circuit board 3 is the switch 31. One end of an upper portion of the circuit board 3 is recessed inward to form a lacking groove 33. The circuit board 3 defines a plurality of positioning holes 34. The plurality of the positioning holes 34 are disposed corresponding to the plurality of the hollow positioning pillars 109. The headphone 100 further includes a plurality of positioning elements 7. The plurality of the positioning elements 7 are positioned in the plurality of the positioning holes 34 and the plurality of the positioning elements 7. So, the circuit board 3 is located in the outer housing 1 of the housing 107.

A surface of the inner housing 6 which is towards the outer housing 1 protrudes towards the outer housing 1 to form a U-shaped limiting portion 61. A mouth of the limiting portion 61 faces outward. The first reinforcing portion 225 of the light guiding unit 22 of the button module 2 is assembled inside the limiting portion 61 for locating the light guiding unit 22. The corresponding area of the inner housing 6 is the limiting portion 61.

Referring to FIG. 1 to FIG. 20, when the headphone 100 is assembled, specific assembling steps of the headphone 100 are described as follows: Assemble the light guiding unit 22 in the outer portion of the accommodating space 10, the guiding body 221 partially penetrates through the middle of the button hole 11, and the other side of the outer surface of the guiding body 221 is exposed outside of the button hole 11. An outer end of the guiding board 220 abuts the inner periphery surface 104, and an outer side of the guiding board 220 abuts against the interior surface 103. An outer end of the guiding body 221 abuts the inner periphery surface 104. The first ramp 227 and the second ramp 228 are buckled in the first notch 15 and the second notch 16, respectively. The first reinforcing portion 225 is restricted into the first recess 151 of the first notch 15. The first ramp 227 is buckled in the second recess 152. The two stopping portions 153 are blocked in the two curving portions 229. The two blocking portions 202 abut against the two stopping portions 153 of the first notch 15 of the outer housing 1. The outer end of the guiding board 220 is positioned between the two second retaining walls 14. The two second reinforcing portions 226 are located between the two second retaining walls 14, and the two second reinforcing portions 226 abut against the two facing surfaces of the two second retaining walls 14 to fasten the light guiding unit 22. The supporting base 222 resists against the two reinforcing ribs 12. The supporting base 222 is received in the interval 132, and the supporting base 222 is located between the two first retaining walls 13, and the two hooks 224 hook the two outer end surfaces of the two first retaining walls 13. The section of the outer corresponding structure of the button module 2 is the first ramp 227. The other section of the outer corresponding structure of the button module 2 is the second ramp 228.

Next, assemble the two push buttons 21 in the outer portion of the accommodating space 10 of the outer housing 1, and the two button caps 212 pass through an upper portion and a lower portion of the button hole 11, respectively. The light guiding unit 22 is assembled in the button hole 11, so when the two button caps 212 pass through the button hole 11, the two button caps 212 are guided by the light guiding unit 22, and the two button caps 212 are oriented by the light guiding unit 22, and the two retaining portions 215 of the two push buttons 21 abut against an upper portion and a lower portion of the protruding platform 108. Two facing surfaces of the two base boards 213 of the two push buttons 21 abut against the upper surface and the lower surface of the guiding body 221. Two outer surfaces of the two base boards 213 of the two push buttons 21 abut against the inner periphery surface 104 of the outer housing 1.

Later, assemble the circuit board 3 in the outer portion of the accommodating space 10 of the outer housing 1, insert the guiding body 221 of the light guiding unit 22 into the inserting slot 32, and make the circuit board 3 abut against the supporting base 222 of the light guiding unit 22, the two first retaining walls 13, the two second retaining walls 14 and the two retaining portions 215 of the two push buttons 21. The two switches 31 of the circuit board 3 resist against the two pressing portions 216 of the two push buttons 21 to fasten the two push buttons 21 and the light guiding unit 22 to the circuit board 3. Then, assemble the cavity holder 5 into the outer portion of the accommodating space 10 of the outer housing 1, the cavity holder 5 is located at an inner side of the circuit board 3. At last, assemble the inner housing 6 with the outer housing 1, so that the inner housing 6 and the outer housing 1 surround the accommodating space 10, and the accommodating space 10 is sealed between the inner housing 6 and the outer housing 1, the limiting portion 61 is mounted around the first reinforcing portion 225 to position the light guiding unit 22 between the limiting portion 61 and the inner periphery surface 104, and the light guiding unit 22 is located between the interior surface 103 of the outer housing 1 and the surface of the inner housing 6 which is towards the outer housing 1. The limiting portion 61 is mounted around the first reinforcing portion 225 to guide the inner housing 6 and position the inner housing 6 and the light guiding unit 22. The cavity holder 5 and the inner housing 6 partially project into the lacking groove 33.

As described above, the two fixing arms 223 abut against the two facing surfaces of the two first retaining walls 13 for locating the light guiding unit 22 in the outer housing 1 of the housing 107, and the two hooks 224 hook the two outer end surfaces of the two first retaining walls 13 to prevent the light guiding unit 22 breaking away from the assembling direction. Furthermore, the first reinforcing portion 225 is mounted inside the limiting portion 61 to locate the light guiding unit 22, the two second reinforcing portions 226 abut against the two facing surfaces of the two second retaining walls 14 to fasten the light guiding unit 22, the first ramp 227 of the light guiding unit 22 is fastened in the first notch 15 and the first reinforcing portion 225 is restricted into the first notch 15 to locate the light guiding unit 22 to the outer housing 1, and the second ramp 228 of the light guiding unit 22 is fastened in the second notch 16 to locate the light guiding unit 22 to the outer housing 1. In addition, the guiding body 221 of the light guiding unit 22 is inserted into the inserting slot 32, and the circuit board 3 abuts against the supporting base 222 of the light guiding unit 22, the two first retaining walls 13, the two second retaining walls 14 and the two retaining portions 215 of the two push buttons 21 to locate the two push buttons 21 with the light guiding unit 22, and the two push buttons 21 are isolated by the light guiding unit 22. As a result, the headphone 100 including the light guiding unit 22 that is able to be stably assembled.

What is claimed is:

1. A headphone, comprising:

an outer housing having:

a peripheral wall, an inner surface of the peripheral wall being defined as an inner periphery surface, an outer surface of the peripheral wall being defined as an outer periphery surface;

a button hole penetrating through the inner periphery surface and the outer periphery surface;

an outer wall connected with an outer periphery of the peripheral wall, an inner surface of the outer wall being defined as an interior surface, the inner periphery surface being connected with a periphery of the interior surface; and two first retaining walls extended from the interior surface, the two first retaining walls being corresponding to the button hole;

a light guiding unit mounted in the outer housing, and the light guiding unit partially penetrating through the button hole, the light guiding unit having:

a guiding body partially passing through a middle of the button hole;

a guiding board, an outer portion of the guiding body protruding towards the interior surface to form the guiding board, an inner end of the guiding board being positioned between the two first retaining walls, an inner surface of the guiding board protruding inward to form a propping portion; and a supporting base, an inner surface of the propping portion protruding inward, and then extending upward and downward to form the supporting base, the guiding board being connected with a middle of the supporting base by the propping portion, the supporting base being clamped by the two first retaining walls, an upper portion of the supporting base and a lower portion of the supporting base being bent outward to form two fixing arms, the two fixing arms abutting against two facing surfaces of the two first retaining walls, two outer ends of the two fixing arms oppositely protruding perpendicular to the two fixing arms to form two hooks, the two hooks hooking two outer end surfaces of the two first retaining walls;

two push buttons mounted in the outer housing, the two push buttons partially passing through the button hole, the light guiding unit being positioned between the two push buttons; and a circuit board mounted in the outer housing, an edge of the circuit board being recessed inward to form an inserting slot, the guiding body being inserted into the inserting slot to locate the light guiding unit between the circuit board and the inner periphery surface of the outer housing, the circuit board abutting against the supporting base to locate the light guiding unit between the circuit board and the interior surface of the outer housing.

2. The headphone as claimed in claim 1, wherein the inner periphery surface is recessed opposite to the circuit board to form a first notch, the inner periphery surface is recessed opposite to the circuit board to form a second notch, the first notch is connected to a middle of an inner side of the button hole, the first notch is communicated with the button hole, the second notch is connected to a middle of an outer side of the button hole, the second notch is communicated with the button hole, one side of an outer surface of the guiding body slantwise extends outward and opposite to the interior surface to form a first ramp, an outer surface of the guiding board which is away from the first ramp slantwise extends inward and towards the interior surface to form a second ramp, the first ramp is fastened in the first notch, the second ramp is fastened in the second notch.

3. The headphone as claimed in claim 2, wherein the other side of the outer surface of the guiding body is arched outward to form a convex portion, the first ramp and the second ramp are isolated by the convex portion, the convex portion projects out of the middle of the button hole.

4. The headphone as claimed in claim 2, wherein two portions of the inner periphery surface extend inward to form two second retaining walls, the two second retaining walls are placed between the button hole and the interior surface, the two second retaining walls abut against the circuit board, the second notch is formed between the two second retaining walls, the light guiding unit is disposed among the two first retaining walls and the two second retaining walls to locate the light guiding unit.

5. The headphone as claimed in claim 2, wherein the first notch has a first recess, a second recess and two stopping portions, an inner side of the first notch is defined as the first recess which is recessed opposite to the circuit board in the inner periphery surface, a middle of one side of the first recess which is adjacent to the button hole extends to the middle of the inner side of the button hole to form the second recess, a width of the first recess is wider than a width of the second recess, the first recess is communicated with the second recess, an upper wall and a lower wall of the second recess are defined as the two stopping portions, a middle of an inner portion of the guiding body protrudes opposite to the guiding board to form a first reinforcing portion, a junction between an upper portion of the first reinforcing portion and the guiding body is curved inward to form one curving portion, a junction between a lower portion of the first reinforcing portion and the guiding body is curved inward to form the other curving portion, the first reinforcing portion is restricted into the first recess, the first ramp is buckled in the second recess, the two stopping portions are blocked in the two curving portions.

6. The headphone as claimed in claim 5, wherein the upper portion of the first reinforcing portion and the lower portion of the first reinforcing portion protrude beyond an upper surface of the guiding body and a lower surface of the guiding body to form two blocking portions, the two blocking portions are blocked by the two stopping portions.

7. The headphone as claimed in claim 5, wherein the light guiding unit has two second reinforcing portions, one second reinforcing portion is perpendicularly extended from an upper surface of the guiding board and an upper surface of the guiding body, the other second reinforcing portion is perpendicularly extended from a lower surface of the guiding board and a lower surface of the guiding body, the two second reinforcing portions are connected to an inner end of the first reinforcing portion, two portions of the inner periphery surface extend inward to form two second retaining walls, the two second reinforcing portions and an outer end of the guiding board are disposed between the two second retaining walls, the two second reinforcing portions abut against two facing surfaces of the two second retaining walls.

8. The headphone as claimed in claim 5, further comprising an inner housing covering the outer housing, a surface of the inner housing which is towards the outer housing protruding towards the outer housing to form a U-shaped limiting portion, the first reinforcing portion being assembled inside the limiting portion.

9. The headphone as claimed in claim 1, wherein two inner surfaces of the two hooks face towards the two outer end surfaces of the two first retaining walls, the two inner surfaces of the two hooks are matched with the two outer end surfaces of the two first retaining walls, the two inner surfaces of the two hooks are blocked by the two outer end surfaces of the two first retaining walls.

10. The headphone as claimed in claim 1, wherein the outer housing has two reinforcing ribs extended inward from one side of the interior surface, the two reinforcing ribs extend along an up-down direction, the two first retaining walls cross the two reinforcing ribs, the two first retaining walls are perpendicular to the two reinforcing ribs, the supporting base resists against the two reinforcing ribs, the supporting base is located between the two first retaining walls.

11. The headphone as claimed in claim 1, wherein the propping portion is protruded for a short distance from the inner surface of the guiding board.

12. The headphone as claimed in claim 1, wherein the supporting base and the two fixing arms form a lying U shape.

13. A headphone, comprising:
an outer housing having:
a peripheral wall, an inner surface of the peripheral wall being defined as an inner periphery surface, an outer surface of the peripheral wall being defined as an outer periphery surface;
a button hole penetrating through the inner periphery surface and the outer periphery surface;
an outer wall connected with an outer periphery of the peripheral wall, an inner surface of the outer wall being defined as an interior surface, the inner periphery surface being connected with a periphery of the interior surface; and
two first retaining walls extended from the interior surface;
a light guiding unit mounted in the outer housing, and the light guiding unit partially penetrating through the button hole, the light guiding unit having:
a guiding body partially passing through a middle of the button hole;
a guiding board, an outer portion of the guiding body protruding towards the interior surface to form the guiding board;
a first reinforcing portion, a middle of an inner portion of the guiding body protruding opposite to the guiding board to form the first reinforcing portion; and
a supporting base, extending from the guiding board, and then extending upward and downward to form the supporting base, the guiding board being connected with a middle of the supporting base by the propping portion, the supporting base being clamped by the two first retaining walls, an upper portion of the supporting base and a lower portion of the supporting base being bent outward to form two fixing arms, the two fixing arms abutting against two facing surfaces of the two first retaining walls, two outer ends of the two fixing arms oppositely protruding perpendicular to the two fixing arms to form two hooks, the two hooks hooking two outer end surfaces of the two first retaining walls;
two push buttons mounted in the outer housing, the two push buttons partially passing through the button hole, the light guiding unit being positioned between the two push buttons;
a circuit board mounted in the outer housing, an edge of the circuit board being recessed inward to form an inserting slot, the guiding body being inserted into the inserting slot to locate the light guiding unit between the circuit board and the inner periphery surface of the outer housing, the circuit board abutting against the supporting base to locate the light guiding unit between the circuit board and the interior surface of the outer housing; and
an inner housing assembled with the outer housing, a surface of the inner housing which is towards the outer housing protruding towards the outer housing to form a limiting portion, the limiting portion being mounted around the first reinforcing portion to position the light guiding unit between the limiting portion and the inner periphery surface, and the light guiding unit being located between the interior surface of the outer housing and the surface of the inner housing which is towards the outer housing.

14. A headphone, comprising:
an outer housing having:
a peripheral wall, an inner surface of the peripheral wall being defined as an inner periphery surface, an outer surface of the peripheral wall being defined as an outer periphery surface;
a button hole penetrating through the inner periphery surface and the outer periphery surface;
an outer wall connected with an outer periphery of the peripheral wall, an inner surface of the outer wall being defined as an interior surface, the inner periphery surface being connected with a periphery of the interior surface; and
two first retaining walls extended from the interior surface;
a light guiding unit mounted in the outer housing, and the light guiding unit partially penetrating through the button hole, the light guiding unit having:
a guiding body partially passing through a middle of the button hole, an outer end of the guiding body abutting the inner periphery surface;
a guiding board, an outer portion of the guiding body protruding towards the interior surface to form the guiding board, an inner surface of the guiding board protruding inward to form a propping portion, an outer end of the guiding board abutting the inner periphery surface, and an outer side of the guiding board abutting against the interior surface; and a supporting base, an inner surface of the propping portion protruding inward, and then extending upward and downward to form the supporting base, the supporting base being clamped by the two first retaining walls, an upper portion of the supporting base and a lower portion of the supporting base being bent outward to form two fixing arms, the two fixing arms abutting against two facing surfaces of the two first retaining walls, two outer ends of the two fixing arms oppositely protruding perpendicular to the two fixing arms to form two hooks, the two hooks hooking two outer end surfaces of the two first retaining walls;

two push buttons mounted in the outer housing, the two push buttons partially passing through the button hole, the light guiding unit being positioned between the two push buttons; and a circuit board mounted in the outer housing, an edge of the circuit board being recessed inward to form an inserting slot, the guiding body being inserted into the inserting slot to locate the light guiding unit between the circuit board and the inner periphery surface of the outer housing, the propping portion being positioned between circuit board and the guiding body, the circuit board abutting against the supporting base to locate the light guiding unit between the circuit board and the interior surface of the outer housing.

15. The headphone as claimed in claim 14, wherein the guiding board and the guiding body are connected with a middle of the supporting base by the propping portion, two portions of the inner periphery surface extend inward to form two second retaining walls, the two second retaining walls are spaced from each other, the two second retaining walls are in alignment with a middle of an interval between the two first retaining walls, the supporting base is received in the interval, an inner end of the guiding board is positioned between the two first retaining walls, the outer end of the guiding board is positioned between the two second retaining walls.

16. The headphone as claimed in claim 14, wherein one end of an upper portion of the circuit board is recessed inward to form a lacking groove, the headphone further includes a cavity holder and an inner housing, the inner housing covers the outer housing, the cavity holder is mounted between the circuit board and the inner housing, the cavity holder and the inner housing partially project into the lacking groove.

17. The headphone as claimed in claim 14, wherein the guiding body is spaced from an inner wall of the inserting slot which faces towards the guiding body by the propping portion, the inner wall of the inserting slot is shown as a curved shape.

18. The headphone as claimed in claim 14, wherein a junction between a top of the supporting base and one fixing arm forms an arc shape, a junction between a bottom of the supporting base and the other fixing arm forms the arc shape.

19. The headphone as claimed in claim 14, wherein two inner ends of the two facing surfaces of the two first retaining walls are gradually inclined inward and away from each other to form two avoiding surfaces, the two avoiding surfaces avoid the two first retaining walls from contacting the supporting base.

20. The headphone as claimed in claim 14, wherein an outer portion of an upper wall of the inserting slot is curved upward and outward to form a first arc surface, an outer portion of a lower wall of the inserting slot is curved downward and outward to form a second arc surface, the first arc surface and the second arc surface are without contacting the light guiding unit.

* * * * *